United States Patent
Schlosberg et al.

(10) Patent No.: US 9,790,441 B2
(45) Date of Patent: Oct. 17, 2017

(54) PROCESS FOR PRODUCING TRANSPORTATION FUELS FROM OIL SANDS-DERIVED CRUDE

(71) Applicant: EPIC OIL EXTRACTORS, LLC, Ponchatoula, LA (US)

(72) Inventors: Richard H. Schlosberg, Highland Park, IL (US); Richard D. Jordan, Vienna, VA (US); Edward L. Diefenthal, Metairie, LA (US)

(73) Assignee: EPIC OIL EXTRACTORS, LLC, Ponchatoula, LA (US)

( * ) Notice: Subject to any disclaimer, the term of this patent is extended or adjusted under 35 U.S.C. 154(b) by 0 days.

(21) Appl. No.: 14/500,105

(22) Filed: Sep. 29, 2014

(65) Prior Publication Data

US 2015/0090641 A1    Apr. 2, 2015

Related U.S. Application Data

(60) Provisional application No. 61/883,781, filed on Sep. 27, 2013.

(51) Int. Cl.

| | |
|---|---|
| *C10G 1/04* | (2006.01) |
| *C10G 45/04* | (2006.01) |
| *C10G 69/04* | (2006.01) |
| *C10G 11/05* | (2006.01) |
| *C10G 1/00* | (2006.01) |
| *C10G 45/00* | (2006.01) |
| *C10G 45/08* | (2006.01) |
| *C10G 11/00* | (2006.01) |

(52) U.S. Cl.
CPC .............. *C10G 69/04* (2013.01); *C10G 1/002* (2013.01); *C10G 1/045* (2013.01); *C10G 11/00* (2013.01); *C10G 11/05* (2013.01); *C10G 45/00* (2013.01); *C10G 45/08* (2013.01); *C10G 2300/202* (2013.01); *C10G 2300/206* (2013.01); *C10G 2300/301* (2013.01); *C10G 2300/44* (2013.01); *Y02P 30/10* (2015.11); *Y02P 30/446* (2015.11)

(58) Field of Classification Search
CPC ........... C10G 1/04; C10G 45/04; C10G 69/04
See application file for complete search history.

(56) References Cited

U.S. PATENT DOCUMENTS

| | | | | |
|---|---|---|---|---|
| 3,953,321 | A * | 4/1976 | Ganster | C10G 49/24 208/216 R |
| 4,036,732 | A * | 7/1977 | Irani | C10G 1/006 208/390 |
| 4,436,613 | A * | 3/1984 | Sayles | C10G 11/182 208/155 |
| 2012/0091041 | A1 * | 4/2012 | Diefenthal | C10G 1/045 208/390 |

* cited by examiner

*Primary Examiner* — Randy Boyer

(74) *Attorney, Agent, or Firm* — William H. Honaker; Dickinson Wright PLLC

(57) ABSTRACT

Disclosed are processes for extracting deasphalted crude oil from oil sand. Deasphalted crude oil can be extracted using a hydrocarbon recycle solvent stream having specified Hansen blend parameters, with the oil sand being contacted with the hydrocarbon recycle solvent stream in a contact zone of a vessel to separate not greater than 80 wt % of the bitumen present on the oil sand. The separated bitumen is considered a deasphalted crude oil stream, since it has an asphaltenes content substantially lower than that of the total bitumen initially present on the oil sand. The deasphalted crude oil stream can be treated using a hydrotreating catalyst or catalytic cracking catalyst to produce transportation fuel.

13 Claims, 5 Drawing Sheets

PROCESS FOR PRODUCING TRANSPORTATION FUELS FROM OIL SANDS-DERIVED CRUDE

CROSS-REFERENCE TO RELATED APPLICATION

This application claims the benefit of the filing date of U.S. Provisional Application No. 61/883,781, filed Sep. 27, 2013, the contents of which are incorporated herein by reference.

FIELD OF THE INVENTION

This invention relates to a process for producing transportation fuel from oil sands-derived crude. In particular, this invention relates to a process for producing transportation fuel from oil sands-derived crude by the oil sands-derived crude oil through at least one catalytic conversion process.

BACKGROUND OF THE INVENTION

Oil reserves based on mineable US oil sands deposits have been estimated at between 36 and 54 billion barrels of crude oil. (US Geologic Survey 2006.) Oil sand reserves in Utah alone have been estimated at between 12 and 18 billion barrels of crude oil. (USGS 2006.) For comparison, Bakken type crude oil, which is a crude oil derived from underground shale oil deposits in North Dakota, has been estimated by the USGS to have 7.4 billion barrels of technically recoverable crude oil. (2013) Although oil shale-derived crude oil has substantially different characteristics from mineable oil sands, both types of crude oils are converted to transportation fuels in US refineries. However, due to environmental concerns in the US of how crude oil is typically obtained from oil sands, essentially all of the oil sands-derived crude oil refined in the US today is imported from Canada. Nevertheless, due to the substantial quantity of crude oil that can be derived from mineable US oil sands, as well as oil sands throughout the world, there is a great interest in recovering crude oil from mineable oil sands and processing the crude oil to produce transportation fuel.

Oil sands extraction technologies in use in Canada today are based on a hot water extraction process that is designed to extract essentially all of the oily tar (~90+%) from the oil sands. An environmentally undesirable byproduct of the hot water process is the formation of "tailings ponds," which comprise an oil and water emulation and fine sand particles. The tailings ponds must be treated to further remove the oil and sand from the water, which can take several years. This process, therefore, raises particular environmental concerns in the US.

The oil sands extraction technologies have been historically designed to fully separate as much as possible of the oily tar (bitumen) from the sand, then send the bitumen-derived crude oil to multiple upgrade plants. In general, the upgrade plants are divided into primary upgrading and secondary upgrading plants. Primary upgrading plants include a variety of operating units such as distillation columns, cokers, hydrotreaters and hydrocrackers, which produce a synthetic type of crude oil that must be further processed in the secondary upgrading plant. The primary upgrading processes also produce a significant "petcoke" by-product, which is essentially a graphite material having little commercial utility.

The synthetic crude produced in the primary upgrading plant is then sent to a secondary upgrading plant. Secondary upgrading plants include catalytic conversion processes designed to convert the synthetic crude to useful retail products including transportation fuels.

According to Couch, Keith A., et al, "Impact of bitumen feeds on the FCCU: part I," www.digitalrefining.com/article/1000731, PTQ Q3 2008, primary importers of Canadian bitumen-derived crude oil to the US have historically been refiners in the Rocky Mountain states (PADD IV) and Midwest (PADD II). Wider importation of bitumen-derived crude oil has been limited primarily by a lack of pipeline infrastructure to support an economically broader distribution. However, with numerous market pressures compelling refiners to consider increasing their diet of opportunity crudes, pipeline companies are actively working to upgrade their distribution capabilities by expanding mainlines to the US.

A large quantity of heavy crudes has historically been imported into the US from Western Canada. These heavy crudes have varied widely in their assay properties.

In an effort to provide a crude oil with consistent properties, a unique and standardized blend of synthetic crude, diluent and bitumen (SynDilBit) was developed by EnCana, Talisman, Canadian Natural Resources Limited (CNRL) and Petro-Canada, and has been marketed under the name of Western Canadian Select (WCS) since January 2005. WCS has essentially become the benchmark product from Western Canada, and is the crude basis on which refiners have focused on producing transportation fuels from bitumen-derived crude.

Blend specifications for WCS meet an API gravity of 19-22°, carbon residue of 7-9 wt %, sulfur of 2.8-3.2 wt %, and a total acid number (TAN) of 0.7-1.0 mg KOH/g. The resultant crude composition for WCS compared to a standard crude such as West Texas Intermediate (WTI) shows that WCS has three times more residual material than the benchmark conventional crude, West Texas Intermediate (WTI), 50% more vacuum gas oil (VGO), half the distillate and half of the naphtha.

In addition to the composition differences between WCS and more conventional crudes, the resulting VGO qualities are much lower compared to the more conventional crudes. This can be a particular problem, since the VGO must be processed through catalytic conversion processes in order produce substantial quantities of transportation fuels. Because of the low quality of the bitumen-derived crude, there is a substantial concern of the negative impact on catalytically converting the crude oil to desirable levels of transportation fuel.

Improved processes for extracting bitumen-derived crude oil from mineable oil sands are, therefore, desired to eliminate the formation of "tailings ponds." Improved processes are also desired that produce less petroleum coke (petcoke or coke) by-product. In addition, it is desired to produce higher quality transportation fuels from bitumen-derived crude oil with less energy consumption and fewer refining steps. It is further desired to extract bitumen-derived crude oil and produce transportation fuel from the bitumen-derived crude in a manner that translates to a significantly smaller carbon "footprint."

SUMMARY OF THE INVENTION

This invention provides processes for extracting bitumen-derived crude oil from mineable oil sands and processing the bitumen-derived crude oil into transportation fuels in a manner such that tailings ponds and undesirable quantities of coke by-product are eliminated. The invention also provides for the production of higher quality transportation fuels from bitumen-derived crude oil with less energy consumption and fewer refining steps. The extraction of bitumen-derived crude oil, and production of transportation fuel from the bitumen-derived crude, according to the invention translates to a significantly smaller carbon "footprint."

According to one aspect of the invention, there is provided a process for producing a transportation fuel from a high quality oil sands-derived crude oil. The oil sands-derived crude oil that is provided as a feed source has an ASTM D7169 5% distillation point of from 400° F. to 700° F. Transportation fuel is produced from the provided oil sands-derived crude oil by treating the oil sands-derived crude oil through at least one catalytic conversion process.

The oil sands-derived crude oil can be further characterized according to any one or more of the following characteristics: asphaltenes content of not greater than 10 wt %; Conradson Carbon Residue (CCR) of not greater than 15 wt %; hydrogen content of at least 10 wt %; and sulfur content of not greater than 4 wt %.

The transportation fuel can be produced from the provided oil sands-derived crude oil by treating the oil sands-derived crude oil through at least one catalytic conversion process including a catalytic cracking process.

The transportation fuel can also be produced from the provided oil sands-derived crude oil by treating the oil sands-derived crude oil through at least one catalytic conversion process including at least one hydrotreating process.

The transportation fuel can also be produced from the provided oil sands-derived crude oil by treating the oil sands-derived crude oil through at least one catalytic conversion process including at least one hydrotreating process and at least one catalytic cracking process.

According to a particular aspect of the invention, there is provided a process for treating deasphalted crude oil extracted from oil sand, which includes a step of supplying a hydrocarbon recycle solvent stream to a contact zone of a vessel. The recycle solvent has a Hansen dispersion blend of not greater than 16, a Hansen polarity blend of less than 1 and a Hansen polarity blend of less than 2.

A feed stream of oil sand is supplied to the contact zone of the vessel, with the oil sand begin comprised of at least 4 wt % total bitumen, based on total weight of the supplied oil sand. The oil sand is contacted with the hydrocarbon recycle solvent in the contact zone of the vessel to separate not greater than 80 wt % of the bitumen present on the oil sand. At least a portion of the hydrocarbon solvent and the separated bitumen are removed from the contact zone of the vessel, and the hydrocarbon solvent is separated from the separated bitumen. The separation produces the hydrocarbon recycle solvent stream and a deasphalted crude oil stream, with the deasphalted crude oil stream having an ASTM D7169 5% distillation point of from 400° F. to 700° F., an asphaltenes content of not greater than 10 wt %, a Conradson Carbon Residue (CCR) of not greater than 15 wt % and sulfur content of not greater than 4 wt %. The deasphalted crude oil stream can be treated to with a hydrotreating catalyst or catalytic cracking catalyst to produce the transportation fuel.

In an embodiment, the hydrocarbon recycle stream is comprised of at least 90 wt % of one or more $C_3$-$C_6$ paraffin compounds. For example, the hydrocarbon recycle stream can be comprised of at least 90 wt % of one or more of propane, butane and pentane. In particular, the hydrocarbon recycle stream can be comprised of at least 90 wt % of propane.

In an embodiment, total hydrocarbon solvent supplied to the contact zone of the vessel used to extract the deasphalted oil of the invention is comprised of at least 90 wt % of the recycle solvent stream.

The deasphalted crude oil stream can be treated with a hydrotreating catalyst comprised of at least one Group VIB metal and at least one non-noble Group VIII metal. For example, the treatment with the hydrotreating catalyst can be carried out at a temperature of 260° C. to 380° C., a pressure of 30-160 bar and a hydrogen partial pressure 5-100 bar, with a hydrogen consumption of from 0.05 wt % to 2 wt %.

Alternatively, or following hydrotreament, the deasphalted crude oil stream can be treated with a catalytic cracking catalyst comprised of a crystalline tetrahedral framework oxide component. The treatment with the catalytic cracking catalyst produces catalytically cracked product streams comprising a naphtha stream, with the naphtha stream being ≥45 wt % of the total amount of cracked product streams produced.

In embodiment, the catalytically cracked product streams comprise a heavy cycle oil stream that is ≤25 wt % of the total amount of cracked products produced. The catalytically cracked product streams can comprise the naphtha stream and the heavy cycle oil stream at a weight ratio of the naphtha stream to the heavy cycle oil stream of ≥2:1.

In an embodiment, the deasphalted crude oil is hydrotreated prior to a catalytic cracking step by treating the deasphalted crude oil stream with a hydrotreating catalyst comprised of at least one Group VIB metal and at least one non-noble Group VIII metal.

In an embodiment, the deasphalted crude oil stream has an aromatic hydrogen content of ≤30%. The deasphalted crude oil stream can have an aromatic carbon content of ≤30%, and the deasphalted crude oil stream can have an aromatic carbon to hydrogen ratio of ≥1.5:1.

Figure 1A:
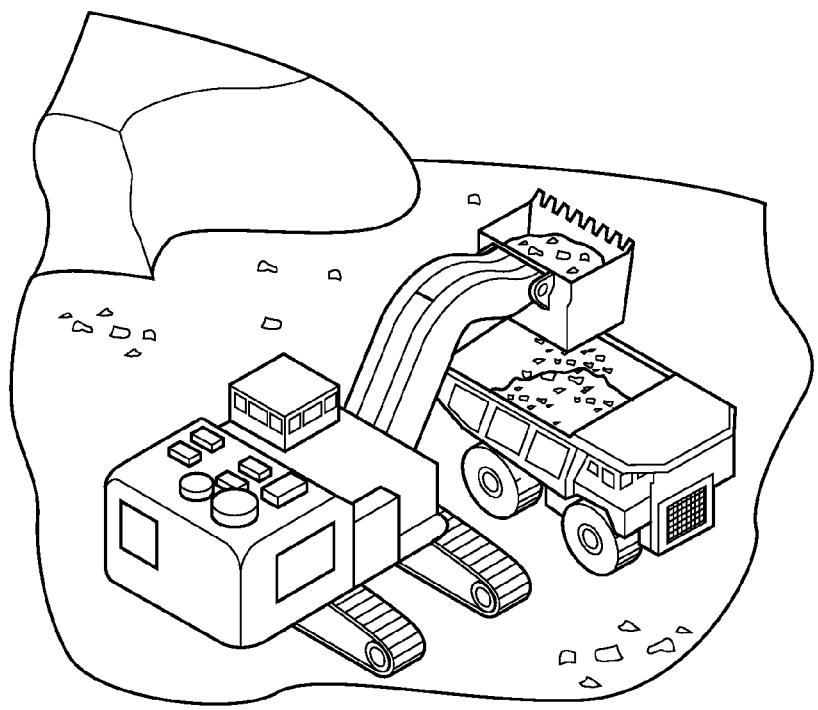
FIGS. 1A-1E are pictorial representations of prior art steps used in mining oil sands, extracting oily tar bitumen from the oil sands, and upgrading the bitumen to fuels and other hydrocarbons.
Figure 1C:
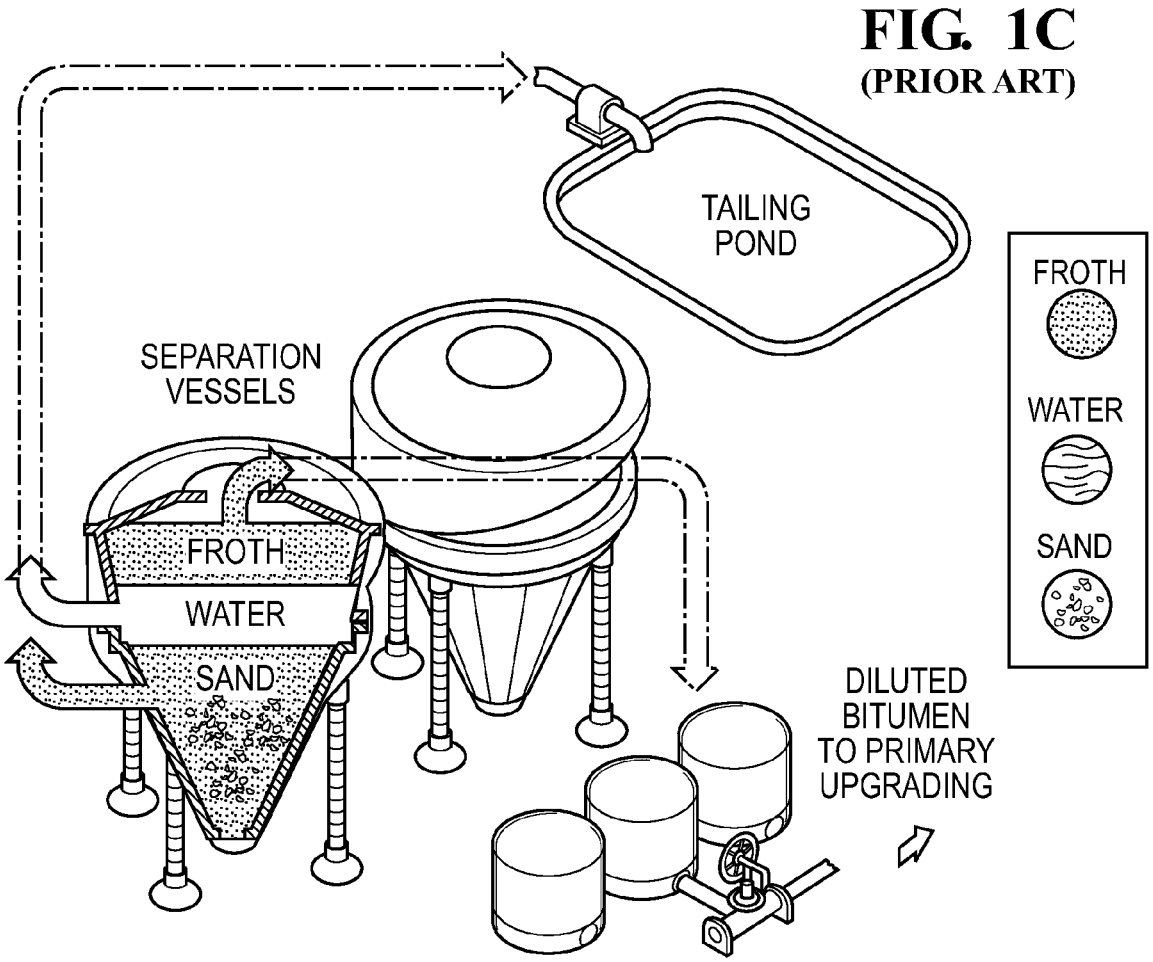
Figure 1B:
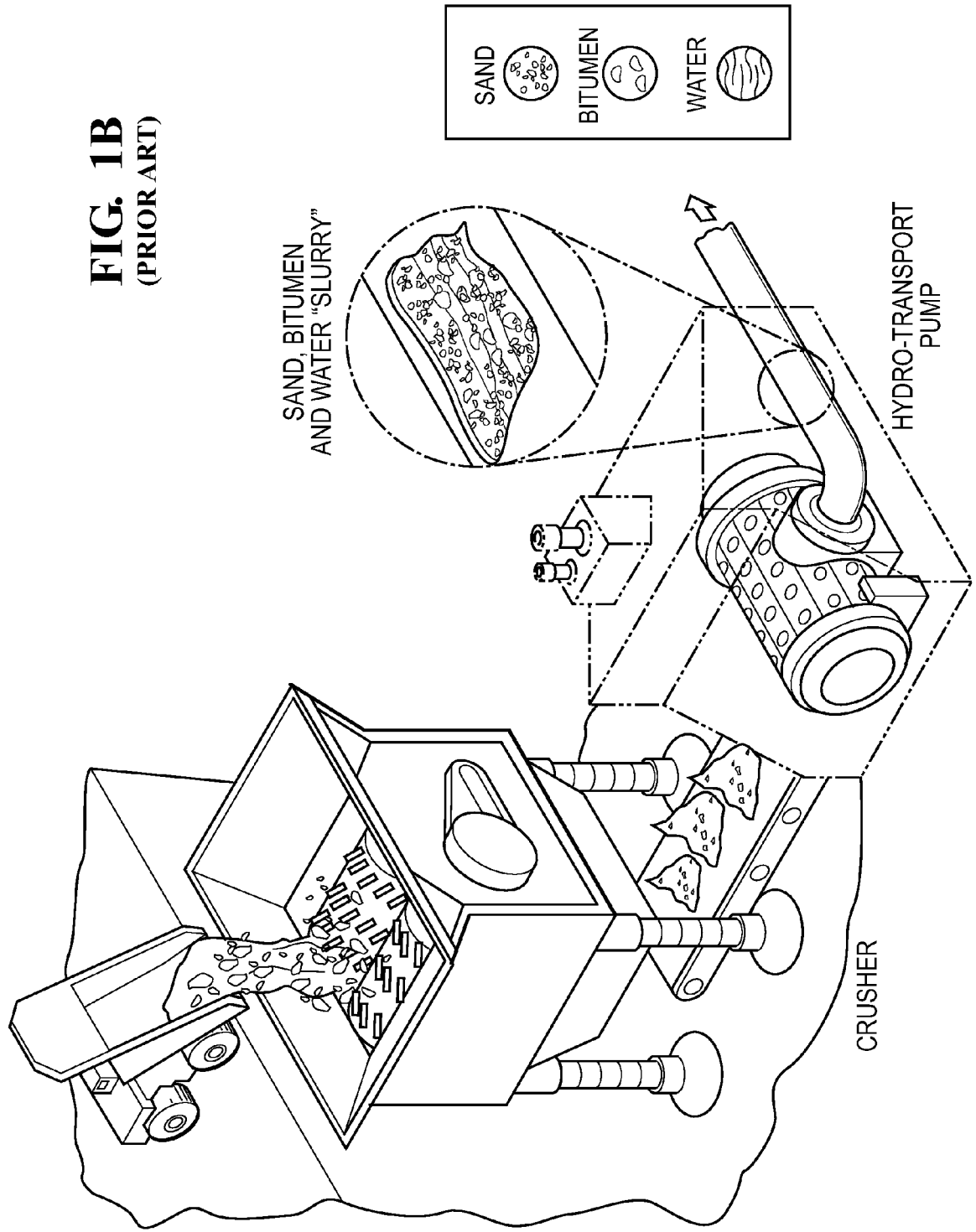
Figure 1D:
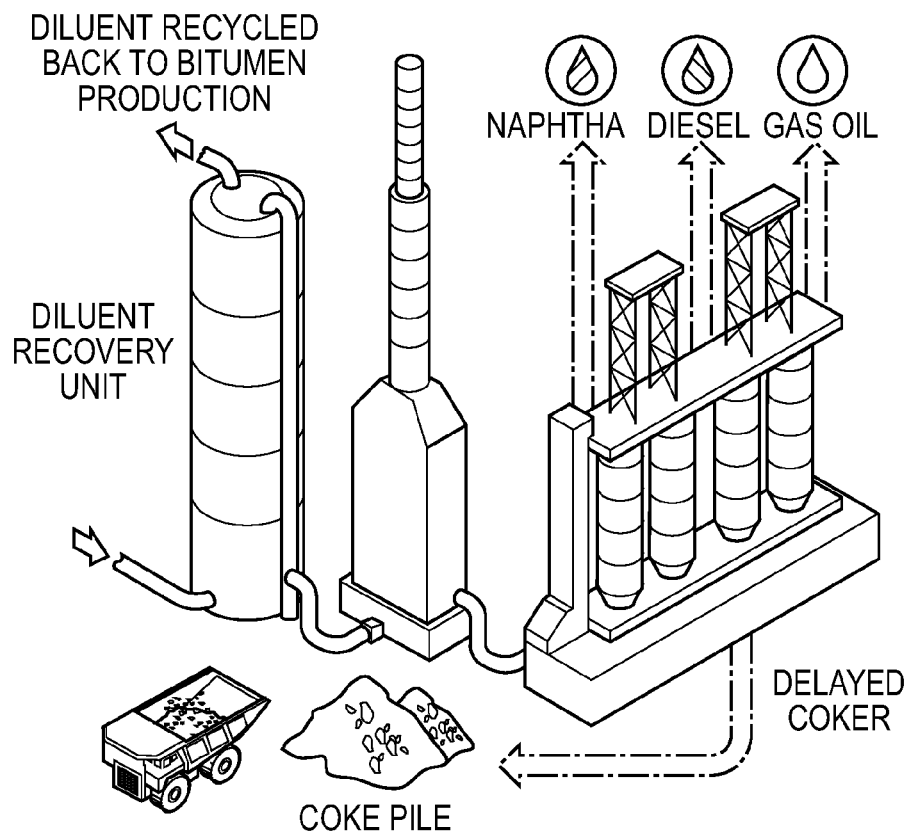
Figure 1E:
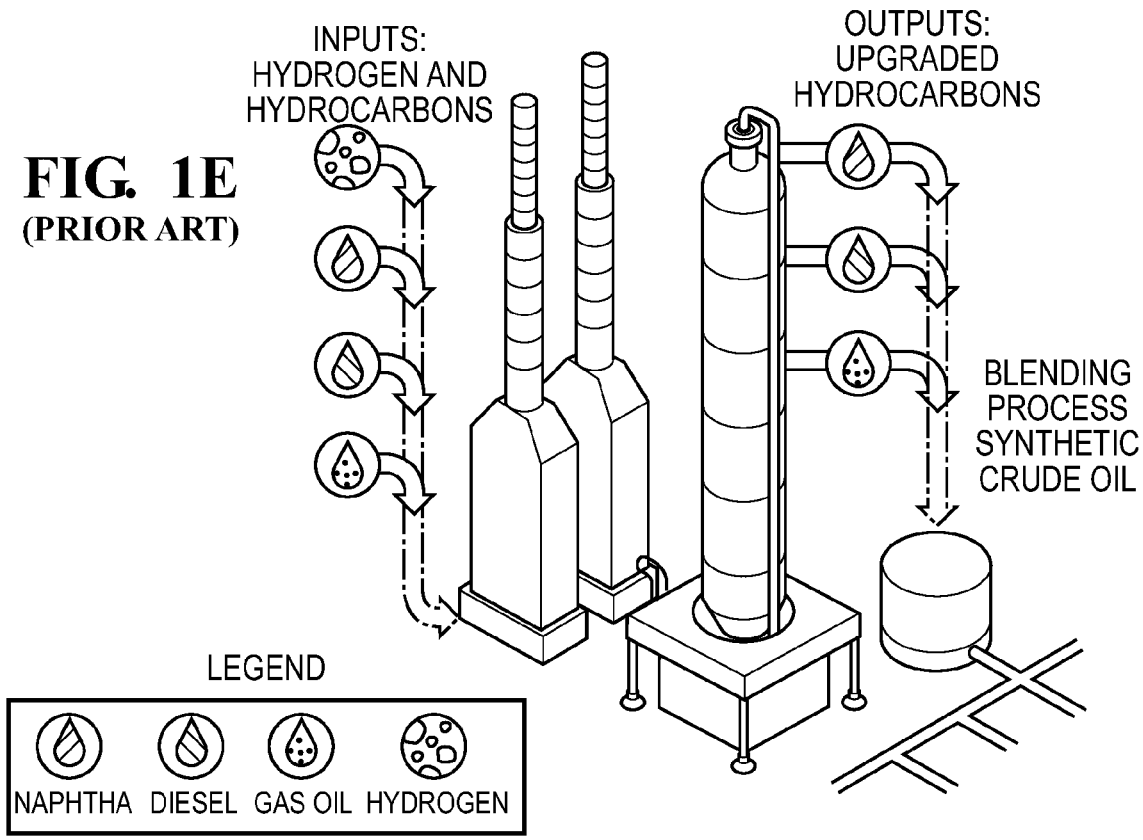

Although the invention can be described in terms of a hydrocarbon extraction and/or upgrading process, particularly an oil sands extraction and upgrading process, the invention is not to be limited to the exact embodiment shown in the figures. In other words, to the extent that the following detailed description is specific to a particular embodiment or a particular use, the figures are intended to be illustrative only, and are not to be construed as limiting the scope of the invention. On the contrary, the figures are intended to cover all alternatives, modifications and equivalents that may be included within the spirit and scope of the overall description of the invention.

DETAILED DESCRIPTION OF THE INVENTION

Introduction

High quality deasphalted oil for production of transportation fuel can be produced by selectively extracting an oil fraction from the heavy bitumen tar on oil sands materials. Because the extraction process does not need water to extract the oil, it can be effectively carried out from a US based oil sands resource with low carbon impact, with no tailings ponds being produced.

The high quality deasphalted crude oil is sufficiently low in asphaltenes and metals such that a primary upgrading or coking plant is not necessary for producing high quality transportation fuels from the deasphalted crude oil. Only a secondary upgrading plant, involving simple hydrotreating and catalytic cracking (e.g., fluid cat cracking or FCC), is needed to make motor gasoline, diesel fuel and jet fuel. The quality of the deasphalted oil stream is such that small refineries (<50,000 barrels per day capacity) having only a secondary upgrading plant can readily process the oil and convert it to high value transportation fuels.

Water-Free Process

According to this invention, an initial separation is carried out, via the choice of hydrocarbon extracting solvent and extraction conditions, such that the oil extracted from the oil sands is a high quality deasphalted oil. This deasphalted oil has a very low asphaltene (heptane insoluble) content, very low metals content, a reduced sulfur level, and a higher API gravity (lower viscosity) as compared with the fully separated bitumen recovered in today's commercial processes. The features of the process of this invention translate into a reduced energy and hydrogen consumption requirement for upgrading the deasphalted crude oil to the desired product mix, which includes motor gasoline, jet fuel and diesel fuel.

No water is employed in the process of this invention, and the light, hydrocarbon-based solvent is readily separated from both the remaining solids (tailings) and the deasphalted crude oil. Thus, the tailings, which can be considered benign, can be readily reclaimed. There are no tailings ponds produced, and there is no water contamination.

The process of this invention is effective on a wide variety of oil sands. Examples include, but are not limited to oil sands or oil sand ores from Utah, Kentucky, China, Canada and elsewhere. This is not the case with water-based processes. The water-based processes are much less effective on Utah sands, for example, because of structural differences between the two sands.

The deasphalted oil produced according to the process of this invention is similar to many deasphalted gas oils used as feed stocks for secondary upgrading processes. However, the deasphalted oil produced from the process according to this invention is lower in asphaltene content than typical bitumen-derived crude oils. The deasphalted crude oil produced according to this invention can be considered a partially hydrogenated gas oil.

The deasphalted oil produced according to the process of this invention can be hydrotreated to produce a hydrotreated deasphalted gas oil. The hydrotreated deasphalated gas oil can then be sent to a catalytic conversion unit such as a catalytic cracking unit to produce high quality transportation fuels. Undesirable coke byproducts are not made in this process, since no primary upgrading (i.e., coker or coking process or thermal cracking process) is required.

The process can be carried out at relatively mild conditions, for example, at ambient to 80° C., such as ambient to 40° C., and less than fifteen atmospheres, such as less than ten atmospheres, of pressure. The process is low-energy in that the deasphalted oil is upgraded without processing through a thermal upgrading or cracking process such as a coker unit or a thermal cracker, and the process can be operated with many off-the-shelf pieces of equipment.

Oil Sand

Oil can be extracted from any oil sand according to this invention. The oil sand can also be referred to as tar sand or bitumen sand. Additionally, the oil sand can be characterized as being comprised of a porous mineral structure, which contains an oil component. The entire oil content of the oil sand can be referred to as bitumen. Bitumen can be comprised of numerous oil components. For example, bitumen can be comprised of a flowable oil component, various volatile hydrocarbons and various non-volatile hydrocarbons, such as asphaltenes. Oil sand can be relatively soft and free flowing, or it can be very hard or rock-like, while the bitumen content may vary over a wide range.

One example of an oil sand from which an oil composition, including bitumen, can be extracted according to this invention can be referred to as water wet oil sand, such as that generally found in the Athabasca deposit of Canada. Such oil sand can be comprised of mineral particles surrounded by an envelope of water, which may be referred to as connate water. The bitumen of such water wet oil sand may not be in direct physical contact with the mineral particles, but rather formed as a relatively thin film that surrounds a water envelope around the mineral particles.

Another example of oil sand from which an oil composition, including bitumen, can be extracted according to this invention can be referred to as oil wet oil sand, such as that generally found in Utah. Such oil sand may also include water. However, these materials may not include a water envelope barrier between the bitumen and the mineral particles. Rather, the oil wet oil sand can comprise bitumen in direct physical contact with the mineral component of the oil sand.

The process of this invention includes a step of supplying a feed stream of oil sand to a contact zone, with the oil sand being comprised of at least 4 wt % of total bitumen (i.e., total oil content), based on total weight of the supplied oil sand. Preferably, the oil sand feed is comprised of at least 6 wt % of total bitumen, more preferably at least 8 wt % of total bitumen, still more preferably at least 10 wt % of total bitumen, based on total weight of the oil sand feed.

The total oil or bitumen content of the solute-bearing material is preferably measured according to the Dean-Stark method (ASTM D95-05e1 Standard Test Method for Water in Petroleum Products and Bituminous Materials by Distillation). The Dean-Stark method can be used to determine the weight percent of oil in an oil sand sample as well as water content. A sample is first weighed, then solute is extracted using solvent. The sample and solvent are refluxed under a condenser using a standard Dean-Stark apparatus. Water (e.g., water extracted from sample along with solute) and organic material (e.g., solvent and extracted solute) condense to form two phases in the condenser. The two layers can be separated and weight percent of water and solute can be determined according to the standard method.

Oil sand can have a tendency to clump due to some stickiness characteristics of the oil component of the oil sand. The oil sand that is fed to the contact zone should not be stuck together such that the oil sand can freely flow through the contact zone or such that extraction of the oil component in the contact zone is not significantly impeded. In one embodiment, the oil sand that is provided or fed to the contact zone has an average particle size of not greater than 20,000 microns. Alternatively, the oil sand that is provided or fed to the contact zone has an average particle size of not greater than 10,000 microns, or not greater than 5,000 microns, or not greater than 2,500 microns.

As a practical matter, the particle size of the oil sand feed material should not be extremely small. For example, it is preferred to have an average particle size of at least 100 microns. However, the process of this invention is also particularly suited to treatment of oil sand that is of relatively small diameter. The separated solid material can also be referred to as fine tailings. Fine tailings can be effectively separated from the product. These fine tailings will also be of low environmental impact, since they can be separated in a relatively dry state and deposited as a substantially non-hazardous solid waste material.

Effective Solvent

Treatment of the oil sand with the solvent is carried out as a vapor state or partial vapor state treatment. For example, at least a portion of the solvent in the vessel that serves as a contact zone for the solvent and oil sand is in the vapor state. In one embodiment, at least 20 wt % of the solvent in the contact zone is in the vapor state. Alternatively, at least 40 wt %, or at least 60 wt %, or at least 80 wt % of the solvent in the contact zone is in the vapor state.

The hydrocarbon of the solvent can be comprised of a mix of hydrocarbon compounds. The hydrocarbon compounds can range from 3 to 10 carbon atoms. In an alternative embodiment, the hydrocarbon of the solvent is comprised of a mixture of hydrocarbon compounds having from 3 to 8, alternatively from 3 to 6, carbon atoms. Examples of such hydrocarbons include aliphatic hydrocarbons and olefinic hydrocarbons. Particular aliphatic hydrocarbons include paraffins. Examples of particular paraffins include, but are not limited to, $C_3$-$C_6$ paraffins. Particularly useful paraffins are propane, butane, pentane and hexane. For example, the hydrocarbon solvent can be comprised of a majority, or at least 90 wt %, or at least 92 wt %, or at least 95 wt %, of at least one of $C_3$-$C_6$ paraffin, including at least one of propane, butane, pentane and hexane.

The hydrocarbon component of the solvent can be selected according to the degree of oil component that is desired to be extracted from the oil sand feed. The degree of extraction can be determined according to the amount of bitumen that remains with the oil sand following treatment or extraction. This can be determined according to the Dean Stark process.

In another aspect, the degree of extraction can be determined according to the asphaltene content of the extracted oil compositions. Asphaltene content can be determined according to ASTM D6560-00(2005) Standard Test Method for Determination of Asphaltenes (Heptane Insolubles) in Crude Petroleum and Petroleum Products.

In general, the solvent in the extraction extracts a bitumen fraction or composition from the oil sand in which the solvent extracted bitumen fraction is low in asphaltene content. Particularly effective hydrocarbons for use as the solvent according to the extraction of this invention can be classified according to Hansen solubility parameters, which is a three component set of parameters that takes into account a compound's dispersion force, polarity, and hydrogen bonding force. The Hansen solubility parameters are, therefore, each defined as a dispersion parameter (D), polarity parameter (P), and hydrogen bonding parameter (H). These parameters are listed for numerous compounds and can be found in *Hansen Solubility Parameters in Practice—Complete with software, data, and examples*, Steven Abbott, Charles M. Hansen and Hiroshi Yamamoto, 3rd ed., 2010, ISBN: 9780955122026, the contents of which are incorporated herein by reference. Examples of the Hansen solubility parameters are shown in Tables 1-12.

TABLE 1

| Alkanes | Hansen Parameter | | |
|---|---|---|---|
| | D | P | H |
| n-Butane | 14.1 | 0.0 | 0.0 |
| n-Pentane | 14.5 | 0.0 | 0.0 |
| n-Hexane | 14.9 | 0.0 | 0.0 |
| n-Heptane | 15.3 | 0.0 | 0.0 |
| n-Octane | 15.5 | 0.0 | 0.0 |
| Isooctane | 14.3 | 0.0 | 0.0 |
| n-Dodecane | 16.0 | 0.0 | 0.0 |
| Cyclohexane | 16.8 | 0.0 | 0.2 |
| Methylcyclohexane | 16.0 | 0.0 | 0.0 |

TABLE 2

| Aromatics | Hansen Parameter | | |
|---|---|---|---|
| | D | P | H |
| Benzene | 18.4 | 0.0 | 2.0 |
| Toluene | 18.0 | 1.4 | 2.0 |
| Naphthalene | 19.2 | 2.0 | 5.9 |
| Styrene | 18.6 | 1.0 | 4.1 |
| o-Xylene | 17.8 | 1.0 | 3.1 |
| Ethyl benzene | 17.8 | 0.6 | 1.4 |
| p-Diethyl benzene | 18.0 | 0.0 | 0.6 |

TABLE 3

| Halohydrocarbons | Hansen Parameter | | |
|---|---|---|---|
| | D | P | H |
| Chloromethane | 15.3 | 6.1 | 3.9 |
| Methylene chloride | 18.2 | 6.3 | 6.1 |
| 1,1 Dichloroethylene | 17.0 | 6.8 | 4.5 |
| Ethylene dichloride | 19.0 | 7.4 | 4.1 |
| Chloroform | 17.8 | 3.1 | 5.7 |
| 1,1 Dichloroethane | 16.6 | 8.2 | 0.4 |
| Trichloroethylene | 18.0 | 3.1 | 5.3 |
| Carbon tetrachloride | 17.8 | 0.0 | 0.6 |
| Chlorobenzene | 19.0 | 4.3 | 2.0 |
| o-Dichlorobenzene | 19.2 | 6.3 | 3.3 |
| 1,1,2 Trichlorotrifluoroethane | 14.7 | 1.6 | 0.0 |

TABLE 4

| Ethers | Hansen Parameter | | |
|---|---|---|---|
| | D | P | H |
| Tetrahydrofuran | 16.8 | 5.7 | 8.0 |
| 1,4 Dioxane | 19.0 | 1.8 | 7.4 |
| Diethyl ether | 14.5 | 2.9 | 5.1 |
| Dibenzyl ether | 17.4 | 3.7 | 7.4 |

TABLE 5

| Ketones | Hansen Parameter | | |
|---|---|---|---|
| | D | P | H |
| Acetone | 15.5 | 10.4 | 7.0 |
| Methyl ethyl ketone | 16.0 | 9.0 | 5.1 |
| Cyclohexanone | 17.8 | 6.3 | 5.1 |

TABLE 5-continued

| Ketones | Hansen Parameter | | |
|---|---|---|---|
| | D | P | H |
| Diethyl ketone | 15.8 | 7.6 | 4.7 |
| Acetophenone | 19.6 | 8.6 | 3.7 |
| Methyl isobutyl ketone | 15.3 | 6.1 | 4.1 |
| Methyl isoamyl ketone | 16.0 | 5.7 | 4.1 |
| Isophorone | 16.6 | 8.2 | 7.4 |
| Di-(isobutyl) ketone | 16.0 | 3.7 | 4.1 |

TABLE 6

| Esters | Hansen Parameter | | |
|---|---|---|---|
| | D | P | H |
| Ethylene carbonate | 19.4 | 21.7 | 5.1 |
| Methyl acetate | 15.5 | 7.2 | 7.6 |
| Ethyl formate | 15.5 | 7.2 | 7.6 |
| Propylene 1,2 carbonate | 20.0 | 18.0 | 4.1 |
| Ethyl acetate | 15.8 | 5.3 | 7.2 |
| Diethyl carbonate | 16.6 | 3.1 | 6.1 |
| Diethyl sulfate | 15.8 | 14.7 | 7.2 |
| n-Butyl acetate | 15.8 | 3.7 | 6.3 |
| Isobutyl acetate | 15.1 | 3.7 | 6.3 |
| 2-Ethoxyethyl acetate | 16.0 | 4.7 | 10.6 |
| Isoamyl acetate | 15.3 | 3.1 | 7.0 |
| Isobutyl isobutyrate | 15.1 | 2.9 | 5.9 |

TABLE 7

| Nitrogen Compounds | Hansen Parameter | | |
|---|---|---|---|
| | D | P | H |
| Nitromethane | 15.8 | 18.8 | 5.1 |
| Nitroethane | 16.0 | 15.5 | 4.5 |
| 2-Nitropropane | 16.2 | 12.1 | 4.1 |
| Nitrobenzene | 20.0 | 8.6 | 4.1 |
| Ethanolamine | 17.2 | 15.6 | 21.3 |
| Ethylene diamine | 16.6 | 8.8 | 17.0 |
| Pyridine | 19.0 | 8.8 | 5.9 |
| Morpholine | 18.8 | 4.9 | 9.2 |
| Aniline | 19.4 | 5.1 | 10 |
| N-Methyl-2-pyrrolidone | 18.0 | 12.3 | 7.2 |
| Cyclohexylamine | 17.4 | 3.1 | 6.6 |
| Quinoline | 19.4 | 7.0 | 7.6 |
| Formamide | 17.2 | 26.2 | 19.0 |
| N,N-Dimethylformamide | 17.4 | 13.7 | 11.3 |

TABLE 8

| Sulfur Compounds | Hansen Parameter | | |
|---|---|---|---|
| | D | P | H |
| Carbon disulfide | 20.5 | 0.0 | 0.6 |
| Dimethylsulfoxide | 18.4 | 16.4 | 10.2 |
| Ethanethiol | 15.8 | 6.6 | 7.2 |

TABLE 9

| Alcohols | Hansen Parameter | | |
|---|---|---|---|
| | D | P | H |
| Methanol | 15.1 | 12.3 | 22.3 |
| Ethanol | 15.8 | 8.8 | 19.4 |
| Allyl alcohol | 16.2 | 10.8 | 16.8 |
| 1-Propanol | 16.0 | 6.8 | 17.4 |

TABLE 9-continued

| Alcohols | Hansen Parameter | | |
|---|---|---|---|
| | D | P | H |
| 2-Propanol | 15.8 | 6.1 | 16.4 |
| 1-Butanol | 16.0 | 5.7 | 15.8 |
| 2-Butanol | 15.8 | 5.7 | 14.5 |
| Isobutanol | 15.1 | 5.7 | 16.0 |
| Benzyl alcohol | 18.4 | 6.3 | 13.7 |
| Cyclohexanol | 17.4 | 4.1 | 13.5 |
| Diacetone alcohol | 15.8 | 8.2 | 10.8 |
| Ethylene glycol monoethyl ether | 16.2 | 9.2 | 14.3 |
| Diethylene glycol monomethyl ether | 16.2 | 7.8 | 12.7 |
| Diethylene glycol monoethyl ether | 16.2 | 9.2 | 12.3 |
| Ethylene glycol monobutyl ether | 16.0 | 5.1 | 12.3 |
| Diethylene glycol monobutyl ether | 16.0 | 7.0 | 10.6 |
| 1-Decanol | 17.6 | 2.7 | 10.0 |

TABLE 10

| Acids | Hansen Parameter | | |
|---|---|---|---|
| | D | P | H |
| Formic acid | 14.3 | 11.9 | 16.6 |
| Acetic acid | 14.5 | 8.0 | 13.5 |
| Benzoic acid | 18.2 | 7.0 | 9.8 |
| Oleic acid | 14.3 | 3.1 | 14.3 |
| Stearic acid | 16.4 | 3.3 | 5.5 |

TABLE 11

| Phenols | Hansen Parameter | | |
|---|---|---|---|
| | D | P | H |
| Phenol | 18.0 | 5.9 | 14.9 |
| Resorcinol | 18.0 | 8.4 | 21.1 |
| m-Cresol | 18.0 | 5.1 | 12.9 |
| Methyl salicylate | 16.0 | 8.0 | 12.3 |

TABLE 12

| Polyhydric alcohols | Hansen Parameter | | |
|---|---|---|---|
| | D | P | H |
| Ethylene glycol | 17.0 | 11.0 | 26.0 |
| Glycerol | 17.4 | 12.1 | 29.3 |
| Propylene glycol | 16.8 | 9.4 | 23.3 |
| Diethylene glycol | 16.2 | 14.7 | 20.5 |
| Triethylene glycol | 16.0 | 12.5 | 18.6 |
| Dipropylene glycol | 16.0 | 20.3 | 18.4 |

According to the Hansen Solubility Parameter System, a mathematical mixing rule can be applied in order to derive or calculate the respective Hansen parameters for a blend of hydrocarbons from knowledge of the respective parameters of each hydrocarbon component and the volume fraction of the hydrocarbon component. Thus according to this mixing rule:

Dblend=$\Sigma$Vi·Di,
Pblend=$\Sigma$Vi·Pi,
Hblend=$\Sigma$Vi·Hi, where Dblend is the Hansen dispersion parameter of the blend, Di is the Hansen dispersion parameter for component i in the blend; Pblend is the Hansen polarity parameter of the blend, Pi is Hansen polarity parameter for component i in the blend, Hblend is the Hansen hydrogen bonding parameter of the blend, Hi is the Hansen hydrogen bonding parameter for component i in the blend, Vi is the volume fraction for component i in the blend, and summation is over all i components in the blend.

The solvent of this invention is defined according to the mathematical mixing rule. The solvent is comprised of a blend of hydrocarbon compounds and can optionally include limited amounts of non-hydrocarbons being optionally present. In such cases when non-hydrocarbon compounds are included in the solvent, the Hansen solubility parameters of the non-hydrocarbon compounds should also be taken into account according to the mathematical mixing rule. Thus, reference to Hansen solubility blend parameters herein, takes into account the Hansen parameters of all the compounds present. Of course, it may not be practical to account for every compound present in the solvent. In such complex cases, the Hansen solubility blend parameters can be determined according to *Hansen Solubility Parameters in Practice*. See, e.g., Chapter 3, pp. 15-18, and Chapter 8, pp. 43-46, for further description.

In order to produce a high quality deasphalted oil product, the solvent is selected to limit the amount of asphaltenes that are extracted from oil sand. The more desirable solvents have Hansen blend parameters that are relatively low. Lower values for the Hansen dispersion blend parameter and/or the Hansen polarity blend parameter are particularly preferred. Especially desirable solvents have low Hansen dispersion blend and Hansen polarity blend parameters.

The Hansen dispersion blend parameter of the solvent is desirably less than 16. In general, lower dispersion blend parameters are particularly desirable. As an example, the solvent is comprised of a hydrocarbon mixture, with the solvent having a Hansen dispersion blend parameter of not greater than 15. Additional examples include solvents comprised of a hydrocarbon mixture, with the solvent having a Hansen dispersion blend parameter of from 13 to 16 or from 13 to 15.

The Hansen polarity blend parameter of the solvent is desirably less than 1. In general, lower polarity blend parameters are particularly desirable. It is further desirable to use solvents that have both low Hansen dispersion blend parameters, as defined above, along with the low Hansen polarity blend parameters. As an example of low polarity blend parameters, the solvent is comprised of a hydrocarbon mixture, with the solvent having a Hansen polarity blend parameter of not greater than 0.5, alternatively not greater than 0.1. Additional examples include solvents comprised of a hydrocarbon mixture, with the solvent having a Hansen polarity blend parameter of from 0 to 1 or from 0 to 0.5.

The Hansen hydrogen bonding blend parameter of the solvent is desirably less than 2. In general, lower hydrogen bonding blend parameters are particularly desirable. It is further desirable to use solvents that have low Hansen dispersion blend parameters and Hansen polarity blend parameters, as defined above, along with the low Hansen hydrogen bonding blend parameters. As an example of low hydrogen bonding blend parameters, the solvent is comprised of a hydrocarbon mixture, with the solvent having a Hansen hydrogen bonding blend parameter of not greater than 1, alternatively not greater than 0.5, or not greater than 0.1, or not greater than 0.05. Additional examples include solvents comprised of a hydrocarbon mixture, with the solvent having a Hansen hydrogen bonding blend parameter of from 0 to 1 or from 0 to 0.5 or from 0 to 0.1 or from 0 to 0.05.

The solvent can be a blend of relatively low boiling point compounds. Since the solvent is a blend of compounds, the boiling range of solvent compounds useful according to this invention, as well as the crude oil compositions produced according to this invention, can be determined by batch distillation according to ASTM D86-09e1, Standard Test Method for Distillation of Petroleum Products at Atmospheric Pressure.

In one embodiment, the solvent has an ASTM D86 10% distillation point of at least −45° C. Alternatively, the solvent has an ASTM D86 10% distillation point of at least −40° C., or at least −30° C. The solvent can have an ASTM D86 10% distillation point within the range of from −45° C. to 50° C., alternatively within the range of from −35° C. to 45° C., or from −20° C. to 40° C.

The solvent can have an ASTM D86 90% distillation point of not greater than 100° C. Alternatively, the solvent has an ASTM D86 90% distillation point of not greater than 80° C., or not greater than 60° C.

The solvent can have a significant difference between its ASTM D86 90% distillation point and its ASTM D86 10% distillation point. For example, the solvent can have a difference of at least 5° C. between its ASTM D86 90% distillation point and its ASTM D86 10% distillation point, alternatively a difference of at least 10° C., or at least 15° C. However, the difference between the solvent's ASTM D86 90% distillation point and ASTM D86 10% distillation point should not be so great such that efficient recovery of solvent from extracted crude is impeded. For example, the solvent can have a difference of not greater than 60° C. between its ASTM D86 90% distillation point and its ASTM D86 10% distillation point, alternatively a difference of not greater than 40° C., or not greater than 20° C.

Solvents high in aromatic content are not particularly desirable. For example, the solvent can have an aromatic content of not greater than 10 wt %, alternatively not greater than 5 wt %, or not greater than 3 wt %, or not greater than 2 wt %, based on total weight of the solvent injected into the extraction vessel. The aromatic content can be determined according to test method ASTM D6591-06 Standard Test Method for Determination of Aromatic Hydrocarbon Types in Middle Distillates-High Performance Liquid Chromatography Method with Refractive Index Detection.

Solvents high in ketone content are also not particularly desirable. For example, the solvent can have a ketone content of not greater than 10 wt %, alternatively not greater than 5 wt %, or not greater than 2 wt %, based on total weight of the solvent injected into the extraction vessel. The ketone content can be determined according to test method ASTM D4423-10 Standard Test Method for Determination of Carbonyls in $C_4$ Hydrocarbons.

In one embodiment, the solvent can be comprised of hydrocarbon in which at least 60 wt % of the hydrocarbon is aliphatic hydrocarbon, based on total weight of the solvent. Alternatively, the solvent can be comprised of hydrocarbon in which at least 70 wt %, or at least 80 wt %, or at least 90 wt % of the hydrocarbon is aliphatic hydrocarbon, based on total weight of the solvent. Light aliphatic hydrocarbons are preferred, such as $C_3$-$C_6$ aliphatic hydrocarbons. Particular examples include propane, butane, pentane and hexane. Preferred are propane, butane and pentane, with propane being most preferred.

The solvent preferably does not include substantial amounts of non-hydrocarbon compounds. Non-hydrocarbon compounds are considered chemical compounds that do not contain any C—H bonds. Examples of non-hydrocarbon compounds include, but are not limited to, hydrogen, nitrogen, water and the noble gases, such as helium, neon and argon. For example, the solvent preferably includes not greater than 20 wt %, alternatively not greater than 10 wt %, alternatively not greater than 5 wt %, non-hydrocarbon compounds, based on total weight of the solvent injected into the extraction vessel.

Solvent to oil sand feed ratios can vary according to a variety of variables. Such variables include amount of hydrocarbon mix in the solvent, temperature and pressure of the contact zone, and contact time of hydrocarbon mix and oil sand in the contact zone. Preferably, the solvent and oil sand is supplied to the contact zone of the extraction vessel at a weight ratio of total hydrocarbon in the solvent to oil sand feed of at least 0.01:1, or at least 0.1:1, or at least 0.5:1 or at least 1:1. Very large total hydrocarbon to oil sand ratios are not required. For example, the solvent and oil sand can be supplied to the contact zone of the extraction vessel at a weight ratio of total hydrocarbon in the solvent to oil sand feed of not greater than 4:1, or 3:1, or 2:1.

Extraction of High Quality Bitumen-Derived or Oil Sands-Derived Crude Oil

Extraction of deasphalted oil from the bitumen on the oil sands is carried out in a contact zone such as in a vessel having a zone in which the solvent contacts the oil sand. Any type of extraction vessel can be used that is capable of providing contact between the oil sand and the solvent such that a portion of the oil is removed from the oil sand. For example, horizontal or vertical type extractors can be used. The solid can be moved through the extractor by pumping, such as by auger-type movement, or by fluidized type of flow, such as free fall or free flow arrangements. An example of an auger-type system is described in U.S. Pat. No. 7,384,557.

The solvent can be injected into the vessel by way of nozzle-type devices. Nozzle manufacturers are capable of supplying any number of nozzle types based on the type of spray pattern desired.

The contacting of oil sand with solvent in the contact zone of the extraction vessel is at a pressure and temperature in which at least 20 wt % of the hydrocarbon mixture within the contacting zone of the vessel is in vapor phase during contacting. Preferably, at least 40 wt %, or at least 60 wt % or at least 80 wt % of the hydrocarbon mixture within the contacting zone of the vessel is in vapor phase.

Carrying out the extraction process at the desired conditions using the desired solvent enables controlling the amount of oil that is extracted from the oil sand. For example, contacting the oil sand with the solvent in a vessel's contact zone can produce a crude oil composition comprised of not greater than 80 wt %, or not greater than 70 wt %, or not greater than 60 wt %, of the bitumen from the supplied oil sand. That is, the solvent is comprised of a hydrocarbon mix or blend that has the desired characteristics such that the solvent process can remove or extract not greater than 80 wt %, or greater than 70 wt %, or greater than 60 wt %, of the bitumen from the supplied oil sand. This crude oil composition that leaves the extraction zone will also include at least a portion of the solvent.

The extraction is carried out at temperatures and pressures that allow at least a portion of the solvent to be maintained in the vapor phase in the contact zone. Since at least a portion of the solvent is in the vapor phase in the contact zone, higher contact zone temperatures. For example, the contacting of the oil sand and the solvent in the contact zone of the extraction vessel can be carried out at a temperature of at least 35° C., or at least 50° C., or at least 70° C. Upper temperature limits depend primarily upon physical constraints, such as contact vessel materials. In addition, temperatures should be limited to below cracking conditions for the extracted crude. Generally, it is desirable to maintain temperature in the contact vessel at not greater than 500° C., alternatively not greater than 400° C. or not greater than 300° C. or not greater than 100° C.

Pressure in the contact zone can vary as long as the desired amount of hydrocarbon in the solvent remains in the vapor phase in the contact zone. Atmospheric pressure and above is preferred. For example, pressure in the contacting zone can be at least 15 psia (103 kPa), or at least 50 psia (345 kPa), or at least 100 psia (689 kPa), or at least 150 psia (1034 kPa). Extremely high pressures are not preferred to ensure that at least a portion of the solvent remains in the vapor phase. For example, the contacting of the oil sand and the solvent in the contact zone of the extraction vessel can be carried out a pressure of not greater than 600 psia (4137 kPa), alternatively not greater than 500 psia (3447 kPa), or not greater than 400 psia (2758 kPa) or not greater than 300 psia (2068 kPa).

Separation of Solvent from Crude Oil

Because there is a substantial difference between the boiling points of the hydrocarbon solvent and the deasphalted crude oil of the invention, a substantial portion of the solvent can be separated from the deasphalted crude oil composition to produce a crude oil product that can be pipelined, transported by other means such as railcar or truck, or further upgraded to make fuel products. The separated solvent can then be recycled. Since the extraction process incorporates a relatively light solvent blend relative to the crude oil composition, the solvent portion can be easily recovered, with little if any external make-up being required.

The crude oil composition that is removed from the contact zone of the extraction vessel comprises the deasphalted oil component extracted from the oil sand and at least a portion of the solvent. At least a portion of the solvent in the oil composition can be separated and recycled for reuse as solvent in the extraction step. This separated solvent is separated so as to match or correspond within 15%, preferably within 10% or 5% or 3%, of the Hansen solubility and distillation characteristics of any make-up solvent, i.e., the overall generic chemical components and boiling points as described above for the solvent composition. For example, an extracted crude product containing the extracted crude oil and solvent is sent to a separator and a light fraction is separated from a crude oil fraction in which the separated solvent has each of the Hansen solubility and distillation characteristics, with are not greater in range than 15% of the above noted amounts, alternatively within a range of 10% or 5% or 3% of the above noted amounts. Preferably, the separated solvent that is used as recycle solvent has each of the Hanson solubility and distillation characteristics as previously described for the hydrocarbon solvent.

Separation of hydrocarbon recycle solvent can be achieved using any appropriate chemical separation process. For example, separation can be achieved using any variety of evaporators, flash drums or distillation equipment or columns. The separated solvent can be recycled to contact oil sand, and optionally mixed with make-up solvent having the characteristics indicated above.

In embodiment, the hydrocarbon that is removed from the extracted crude oil for use as the recycle solvent is comprised of at least 90 wt %, or at least 92 wt %, or at least 95 wt %, of at least one of $C_3$-$C_6$ paraffin, including at least one of propane, butane, pentane and hexane.

In another embodiment, total hydrocarbon solvent supplied to the contact zone of the vessel used to extract the deasphalted oil of the invention is comprised of at least 90 wt % of the recycle solvent stream. Preferably, total hydrocarbon solvent supplied to the contact zone of the vessel used to extract the deasphalted oil of the invention is comprised of at least 95 wt %, or at least 98 wt %, or at least 99 wt %, of the recycle solvent stream.

Following removal of the deasphalted crude oil composition from the extraction vessel, the crude oil composition is separated into fractions comprised of recycle solvent and deasphalted crude oil product. The deasphalted crude oil product can be relatively high in quality in that it can have relatively low metals and asphaltenes content as described above. The low metals and asphaltenes content enables the crude oil product to be relatively easily upgraded to liquid fuels compared to typical bitumen oils.

Crude Oil Characteristics

The oil sands-derived crude oil of this invention can be upgraded to produce substantial quantities of transportation fuels without primary upgrading. This means that the oil sands-derived crude oil of this invention can be upgraded to produce substantial quantities of transportation fuels in secondary upgrading processes by treating the oil sands-derived crude oil through at least one catalytic conversion process. The oil sands-derived crude oil of this invention is particularly suited as feedstock for catalytic cracking processes. The oil-sands derived crude oil can be optionally partially hydrogenated to saturate single ring aromatic constituents. The partial hydrogenation can be carried out under non-sulfur removing and non-nitrogen removing conditions, since the oil sands-derived crude oil is low aromatic sulfur and nitrogen compounds.

The oil sands-derived crude oil of this invention is reduced in metals and asphaltenes compared to typical processes. Metals content can be determined according to ASTM D5708-11 Standard Test Methods for Determination of Nickel, Vanadium, and Iron in Crude Oils and Residual Fuels by Inductively Coupled Plasma (ICP) Atomic Emission Spectrometry. For example, the oil sands-derived crude oil can have a nickel plus vanadium content of not greater than 150 wppm, or not greater than 125 wppm, or not greater than 100 wppm, based on total weight of the composition.

As another example, the oil sands-derived crude oil can have an asphaltenes content (i.e., heptane insolubles measured according to ASTM D6560 of not greater than 10 wt %, alternatively not greater than 7 wt %, or not greater than 5 wt %, or not greater than 3 wt %, or not greater than 1 wt %, or not greater than 0.05 wt %.

The oil sands-derived crude oil will also have a reduced Conradson Carbon Residue (CCR), measured according to ASTM D4530. For example, oil sands-derived crude oil can have a CCR of not greater than 15 wt %, or not greater than 10 wt %, or not greater than 5 wt %, or not greater than 3 wt %.

The oil sands-derived crude oil will have a relatively high API gravity compared to the bitumen product in typical oil sands extraction processes. API gravity can be determined according to ASTM D287-92(2006) Standard Test Method for API Gravity of Crude Petroleum and Petroleum Products (Hydrometer Method). The crude oil can, for example, have an API gravity of at least 8, or at least 10, or at least 12, or at least 14, depending on the exact solvent composition and process conditions.

The oil sands-derived crude oil will have a relatively high hydrogen content compared to the bitumen product in typical oil sands extraction processes. The oil sands-derived crude oil can have a hydrogen content of at least 10 wt %, or at least at least 11 wt %, or at least at least 11.5 wt %, or at least at least 12 wt %, or at least at least 11 wt %.

The oil sands-derived crude oil will have a relatively low total sulfur content compared to the bitumen product in typical oil sands extraction processes. Total sulfur can be determined according to ASTM D4294-10 Standard Test Method for Sulfur in Petroleum and Petroleum Products by Energy Dispersive X-ray Fluorescence Spectrometry. The oil sands-derived crude oil can have a total sulfur content of not greater than 4 wt %, or not greater than 3 wt %, or not greater than 2 wt %, or not greater than 1 wt %.

The oil sands-derived crude oil has unique boiling point distribution ranges. Boiling point distributions can be determined according to ASTM D7169-11 Standard Test Method for Boiling Point Distribution of Samples with Residues Such as Crude Oils and Atmospheric and Vacuum Residues by High Temperature Gas Chromatography.

In one embodiment, the crude oil has an ASTM D7169 5% distillation point of from 400° F. to 700° F. Alternatively, the solvent has an ASTM D7169 5% distillation point of from 450° F. to 650° F., or from 475° F. to 625° F.

In another embodiment, the crude oil has an ASTM D7169 50% distillation point of not less than 700° F. Alternatively, the solvent has an ASTM D7169 50% distillation point of not less than 750° F., or not less than 800° F.

In another embodiment, the crude oil has an ASTM D7169 50% distillation point of not greater than 1200° F. Alternatively, the solvent has an ASTM D7169 50% distillation point of not greater than 1100° F., or not greater than 1000° F.

In another embodiment, the crude oil has ASTM D7169 5% and 50% distillation points in which there is difference between the distillation points of not greater than 600° F. Alternatively, the crude oil has ASTM D7169 5% and 50% distillation points in which there is difference between the distillation points of not greater than 500° F. or not greater than 400° F.

In another embodiment, the crude oil has ASTM D7169 5% and 50% distillation points in which there is difference between the distillation points of at least 200° F. Alternatively, the crude oil has ASTM D7169 5% and 50% distillation points in which there is difference between the distillation points of at least 250° F. or at least 300° F.

The oil sands-derived crude oil can be characterized as low in aromatic hydrogen, which can be determined according to hydrogen or proton nuclear magnetic resonance (NMR) spectroscopy. For example, the oil sands-derived crude oil can have an aromatic hydrogen content of ≤30%, or ≤20%, or ≤15%, or ≤10%.

The oil sands-derived crude oil can be characterized as low in aromatic carbon, which can be determined according to carbon nuclear magnetic resonance (NMR) spectroscopy. For example, the oil sands-derived crude oil can have an aromatic carbon content of ≤30%, or ≤28%, or ≤26%.

The oil sands-derived crude oil can be characterized based on aromatic carbon to aromatic hydrogen ratio, based on proton and carbon contents determined by nuclear magnetic resonance (NMR) spectroscopy. For example, the oil sands-derived crude oil can have an aromatic carbon to aromatic hydrogen ratio of ≥1.5:1, or ≥2.0:1, or ≥3.0:1, or ≥4.0:1.

The oil sands-derived crude oil of this invention has characteristics particularly suited for feedstock for catalytic cracking processes. The characteristics of the oil-sands derived crude oil are such that the crude oil can be partially hydrogenated to saturate single ring aromatic constituents. The partial hydrogenation can be carried out under non-sulfur removing and non-nitrogen removing conditions, since the oil sands-derived crude oil is low in aromatic sulfur and nitrogen constituents.

Tailings

The tailings from the process can be immediately reclaimed. That is, the oil sands from the process can be considered cleaned sand, since oil has been extracted, and the cleaned sand can be safely placed, directly backing into the ground Alternatively, the remaining heavy, asphaltenic hydrocarbon on the cleaned sand can be extracted. This extracted asphaltenic hydrocarbon can be used to produce asphalt binder material or as a feed material for carbon fiber or other outlets that will not combust the carbon in the asphaltenic hydrocarbon. Thus, the impact on formation of greenhouse gases, such as methane and carbon dioxide, and coke by-product, is significantly reduced in the process versus all others being considered.

Secondary Upgrading

Transportation fuel is produced from the provided oil sands-derived crude oil by treating the oil sands-derived crude oil through secondary upgrading, without primary upgrading. Secondary upgrading includes at least one catalytic conversion process. In one embodiment, the catalytic conversion process includes at least one of a catalytic cracking process and a mild hydrotreating process for saturation of single ring aromatic constituents. As used herein, mild hydrotreating refers to hydrogenation of single ring aromatic constituents present in the crude oil, without hydrodesulfurization and hydrodenitrogenation (i.e., significant hydrodesulfurization and hydrodenitrogenation).

Catalytic cracking of the crude oil can be carried out in a catalytic cracking reactor vessel. For example, the crude oil can be mixed in a riser of a catalytic cracking reactor with catalytic cracking catalyst. The crude oil can be mixed with steam or an inert type of gas at such conditions so as to form a highly atomized stream of a vaporous hydrocarbon-catalyst suspension. Preferably, this suspension flows through the riser into a reactor vessel.

Within the reactor vessel, the catalyst is separated from a hydrocarbon vapor to obtain the desired products, such as by using cyclone separators. The separated vapor comprises cracked hydrocarbon product, and the separated catalyst contains a carbonaceous material (i.e., coke) as a result of the catalytic cracking reaction.

The coked catalyst is preferably recycled to contact additional hydrocarbon feed after the coke material has been removed. Preferably, the coke is removed from the catalyst in a regenerator vessel by combusting the coke from the catalyst under standard regeneration conditions. Preferably, the coke is combusted at a temperature of about 900°-1500° F. and a pressure of about 0-100 psig. After the combustion step, the regenerated catalyst is recycled to the riser for contact with additional hydrocarbon feed. Preferably, the regenerated catalyst contains less than 0.4 wt % coke, more preferably less than 0.1 wt % coke.

The catalyst which is used to process the oil sands-derived crude oil can be any catalyst which is typically used to catalytically "crack" hydrocarbon feeds. It is preferred that the catalytic cracking catalyst comprise a crystalline tetrahedral framework oxide component. This component is used to catalyze the breakdown of primary products from the catalytic cracking reaction into clean products such as naphtha for fuels and olefins for chemical feedstocks. Preferably, the crystalline tetrahedral framework oxide component is selected from the group consisting of zeolites, tectosilicates, tetrahedral aluminophophates (ALPOs) and tetrahedral silicoaluminophosphates (SAPOs). More preferably, the crystalline framework oxide component is a zeolite.

Zeolites which can be employed in accordance with this invention include both natural and synthetic zeolites. These zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, and ferrierite. Included among the synthetic zeolites are zeolites X, Y, A, L, ZK-4, ZK-5, B, E, F, H, J, M, Q, T, W, Z, alpha and beta, ZSM-types and omega.

In general, aluminosilicate zeolites are effectively used in this invention. However, the aluminum as well as the silicon component can be substituted for other framework components. For example, the aluminum portion can be replaced by boron, gallium, titanium or trivalent metal compositions which are heavier than aluminum. Germanium can be used to replace the silicon portion.

The catalytic cracking catalyst used in this invention can further comprise an active porous inorganic oxide catalyst framework component and an inert catalyst framework component. Preferably, each component of the catalyst is held together by attachment with an inorganic oxide matrix component.

The active porous inorganic oxide catalyst framework component catalyzes the formation of primary products by cracking hydrocarbon molecules that are too large to fit inside the tetrahedral framework oxide component. The active porous inorganic oxide catalyst framework component can be a porous inorganic oxide that cracks a relatively large amount of hydrocarbons into lower molecular weight hydrocarbons as compared to an acceptable thermal blank. A low surface area silica (e.g., quartz) is one type of suitable thermal blank. The extent of cracking can be measured in any of various ASTM tests such as the MAT (microactivity test, ASTM D3907-8). Compounds such as those disclosed in Greensfelder, B. S., et al., Industrial and Engineering Chemistry, pp. 2573-83, November 1949, can be used. Alumina, silica-alumina and silica-alumina-zirconia compounds are preferred.

The inorganic oxide matrix component of the catalytic cracking catalyst binds the catalyst components together so that the catalyst product is hard enough to survive interparticle and reactor wall collisions. The inorganic oxide matrix can be made from an inorganic oxide sol or gel which is dried to "glue" the catalyst components together. The inorganic oxide matrix can be comprised of oxides of silicon and aluminum. Separate alumina phases can be incorporated into the inorganic oxide matrix. Species of aluminum oxyhydroxides-g-alumina, boehmite, diaspore, and transitional aluminas such as alpha-alumina, beta-alumina, gamma-alumina, delta-alumina, epsilon-alumina, kappa-alumina, and rho-alumina can be employed. For example, the alumina species can be an aluminum trihydroxide such as gibbsite, bayerite, nordstrandite, or doyelite.

The catalytic cracking reaction can produce a variety of cracked products such as naphtha, light cycle oil, heavy cycle oil residue and light gas. Catalytically cracking the bitumen-derived crude oil of the invention can produce a relatively large quantity of a naphtha stream compared to a heavy cycle oil stream, as well as a relatively small amount of light gas.

In one embodiment, catalytically cracking the bitumen-derived crude oil of the invention can produce a naphtha stream that is ≥45 wt % of the total amount of cracked products produced. Preferably, catalytically cracking the bitumen-derived crude oil of the invention can produce a naphtha stream that is ≥50 wt %, or ≥55 wt %, of the total amount of cracked products produced.

In one embodiment, catalytically cracking the bitumen-derived crude oil of the invention can produce a heavy cycle oil stream that is ≤25 wt % of the total amount of cracked products produced. Preferably, catalytically cracking the bitumen-derived crude oil of the invention can produce a heavy cycle oil stream that is ≤20 wt %, or ≤15 wt %, of the total amount of cracked products produced.

In one embodiment, catalytically cracking the bitumen-derived crude oil of the invention can produce a naphtha stream and a heavy cycle oil stream at a weight ratio of ≥2:1. Preferably, catalytically cracking the bitumen-derived crude oil of the invention can produce a naphtha stream and a heavy cycle oil stream at a weight ratio of ≥3:1, more preferably ≥4:1.

Mild hydrotreating of the oil sands-derived crude oil can be carried out alternatively or in addition to catalytic cracking. In one embodiment, mild hydrotreating is carried out prior to catalytic cracking. Mild hydrotreating can be carried out by passing at least a fraction of the oil sands-derived crude oil fraction over a hydrotreating catalyst in the presence of a hydrogen containing gas under mild hydrotreating conditions.

Mild hydrotreating can include a limited amount of hydrocracking of the constituents of the oil sands-derived crude oil. However, limiting hydrocracking of the constituents can be controlled by proper selection of catalyst and operating conditions.

Mild hydrotreating is performed under conditions suitable for saturation of olefins or single ring aromatics, as well as deoxygenation to reduce total acid number (TAN). Preferably, the reaction is performed at a temperature of 260° C. to 380° C., more preferably 300° C. to 360° C. The reaction pressure is preferably 30-160 bar, more preferably 30-130 bar, still more preferably 30-100 bar. The hourly space velocity is preferably 0.1-10 V/V/Hr, more preferably 0.5-5 V/V/Hr, still more preferably 1-5 V/V/Hr, where V/V/Hr is defined as the volume of oil per hour per volume of catalyst. The hydrogen containing gas is preferably added to establish a hydrogen partial pressure in the reactor of 5-100 bar, preferably 5-70 bar, still more preferably 10-50 bar.

The mild hydrotreating reaction can have a hydrogen consumption of from 0.05 wt % to 2 wt %. For example, the mild hydrotreating reaction can have a hydrogen consumption of from 0.05 wt % to 1.5 wt %, or 0.05 wt % to 1 wt %, or 0.05 wt % to 0.5 wt %

The mild hydrotreating reaction can be carried out at a $H_2$/HC ratio of from 10-50 std $m^3/m^3$. For example, the mild hydrotreating reaction can be carried out at a $H_2$/HC ratio of from 20-50 std $m^3/m^3$ or 30-50 std $m^3/m^3$.

The catalyst used in mild hydrotreating can be any catalyst suitable for saturation of olefins or single ring aromatics, as well as hydrogenation to reduce total acid number (TAN). In one embodiment, mild hydrotreating is carried out to reduce TAN of the oil sands-derived crude, preferably prior to catalytic cracking such as in cases in which the oil sands-derived crude has a TAN of from 1-8 mg KOH/gm.

Hydrotreating catalysts are those containing Group VIB metals (based on the Periodic Table published by Fisher Scientific) and non-noble Group VIII metals. These metals or mixtures of metals are typically present as oxides or sulfides on refractory metal supports. Examples of such catalysts are cobalt and molybdenum oxides on a support such as alumina. Other examples include cobalt/nickel/molybdenum oxides or nickel/molybdenum oxides on a support such as alumina. Such catalysts are typically activated by sulfiding prior to use. Preferred catalysts include cobalt/molybdenum (1-5% Co as oxide, 5-25% Mo as oxide), nickel/molybdenum (1-5% Ni as oxide, 5-25% Mo as oxide) and nickel/tungsten (1-5% Ni as oxide, 5-30% W as oxide) on alumina. Especially preferred are nickel/molybdenum and cobalt/molybdenum catalysts.

Suitable refractory metal supports are metal oxides such as silica, alumina, titania or mixtures thereof. Low acidity metal oxide supports are preferred in order to minimize hydrocracking and/or hydroisomerization reactions. Particularly preferred supports are porous aluminas such as gamma or beta aluminas having average pore sizes of from 50 to 300 Å, a surface area of from 100 to 400 m.sup.2/g and a pore volume of from 0.25 to 1.5 cm.sup.3/g.

EXAMPLES

Example 1—Comparative

A comparative example can be found at the website of Canadian Natural Resources Limited (CNRL): http://webadmin.cnrl.com/upload/media_element/535/01/the-oil-sands-process.pdf. This comparative example is shown in FIGS. 1A-1E. As shown in FIG. 1A, bitumen—a thick, sticky crude oil like cold molasses—is mined from Canadian oil sands using open pit mining. Mining shovels dig up the oil-rich sands and load it into huge trucks, which then transport the oil sands to crushers to begin the extraction process.

During extraction (FIG. 1B), the oil sands material (i.e., ore) is crushed into small pieces, filtered and mixed in a hot water process, which is based on the original Clark hot water process, originally patented by Dr. Karl Clark in 1929. A slurry produced in the hot water process is transported via pipeline to the bitumen (i.e., tar) extraction plant.

In a separation vessel (FIG. 1C), the slurry goes through a frothing process. The sand and water separate and settle to the bottom, while the bitumen tar forms a froth and rises to the top, where it can be skimmed off. The bitumen tar is mixed with a solvent or diluent, such as naphtha, while the sand and water are deposited in a tailings pond.

The bitumen/diluent mixture must go through substantial refinery upgrading to produce high quality transportation fuel. The mixture is sent by pipeline to a primary upgrading plant (FIG. 1D) for a process that will convert the bitumen tar into a synthetic crude oil (SCO). The upgrading process begins with the separation of the diluent from the bitumen tar in the Diluent Recovery Unit (DRU) in a distillation process. The bitumen tar is then transported to the Delayed Coker Unit in the primary upgrading plant, where it is heated to high temperatures. The heat breaks up or "cracks" the large complex bitumen hydrocarbon molecules into smaller hydrocarbon chains. This primary "coking" process produces different hydrocarbon cuts: refinery fuel gas, naphtha, diesel, gas oil and coke. Coke is a byproduct of the primary upgrading plant, and it is transported by trucks to a storage area. Byproduct fuel gas is used in the upgrader's furnaces, and the remaining hydrocarbons require further processing at a Secondary Upgrading plant.

At the Secondary Upgrading plant (SUG) (FIG. 1E), hydrogen is added to stabilize the hydrocarbon molecules. Impurities like sulfur and nitrogen are removed. The remaining different hydrocarbons: naptha, diesel and gas oil, are then blended to make a mixture called Synthetic Crude Oil (SCO). The SCO is the product that is transported via pipelines to refineries across North America, into the U.S.

Example 2

Figure 2:
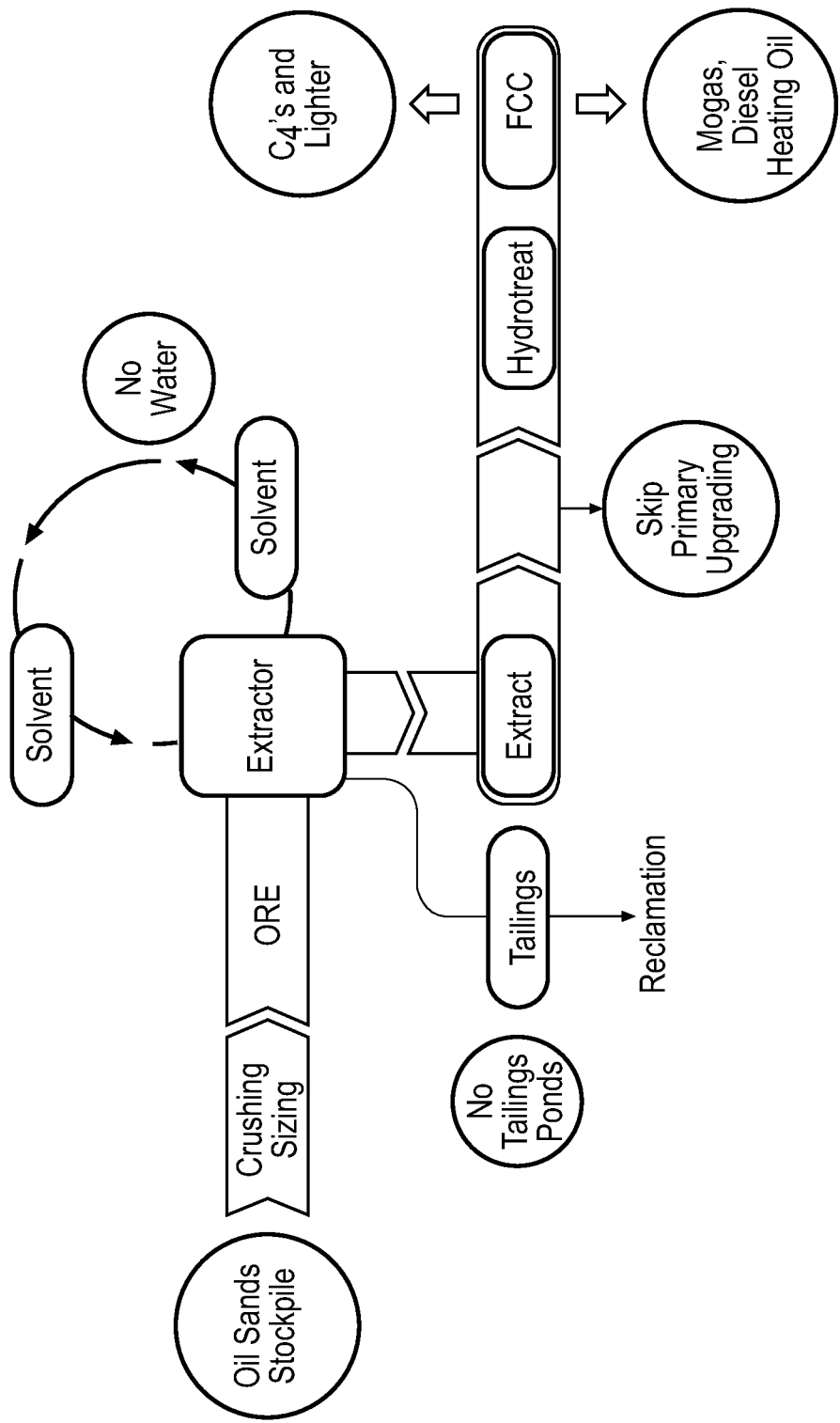
FIG. 2 is a schematic example of the process of this invention.

FIG. 2 is a schematic of an example selective extraction process according to this invention. The mined oil sands is contacted with a light solvent, such as a propane-based solvent, under relatively mild temperature and pressure conditions. A high quality deasphalted crude oil is selectively removed or extracted from the extractor. The extract or crude oil is extremely low in asphaltene and metals content, and referred to as a deasphalted crude oil.

Producing a deasphalted crude oil that is low in asphaltene and metals content means that fewer refining steps are needed to convert the deasphalted crude oil to high quality jet fuel, diesel and gasoline compared to the Synthetic Crude Oil (SCO) currently produced from Canadian oil sands. The deasphalted oil is particularly suited as feedstock for a catalytic cracking process. The deasphalted oil can be optionally hydrotreated under mild conditions to reduce total acid number or partially saturate the deasphalted oil.

Fewer refining steps translate to a significantly smaller carbon "impact" compared to current production processes. Almost all of the propane-based solvent (99+%) is recovered and reused or recycled. No process water is required. No undesirable tailings ponds are produced. Oil sands tailings can be safely placed directly back into the ground.

Example 3

Samples of oil sands ore were crushed and fed to an extraction chamber. The crushed ore was moved through the extraction chamber, while being contacted with propane solvent. The extraction chamber consisted of an auger type moving device in which the auger was used to move the particles through the chamber, and solvent was injected into the extraction chamber as the particles moved through the extraction chamber. An example of the device is depicted in U.S. Pat. No. 7,384,557.

Multiple runs were carried out using different types of oil sands ore, including oil sands ore obtained from oil sands leases in Canada, Utah and Kentucky. Following extraction of the crude oil from the ore, a mixture of the crude oil and solvent was collected. The solvent was separated from the crude oil by flash evaporation.

The separated crude oils were analyzed. Analytical results are provided in the following Table 13.

TABLE 13

| CHARACTERISTIC | Crude from Canadian Ore A | Crude from Canadian Ore B | Crude from Utah Ore | Crude from Kentucky Ore |
|---|---|---|---|---|
| API | 16.2 | | 17.0 (ASTM D4052) | 14.79 (ASTM D4928) |
| Distillation Type | | GCSD (ASTM D7169) | GCSD (ASTM D7169) | GCSD (ASTM D7169) |
| IBP, ° F. | | <97* | 371 | 440 |
| 5 | | 536 | 507 | 554 |
| 10 | | 599 | 569 | 608 |
| 20 | | 687 | 653 | 689 |
| 30 | | 763 | 723 | 758 |
| 40 | | 825 | 787 | 814 |
| 50 | | 895 | 848 | 874 |
| 60 | | 967 | 918 | 941 |
| 70 | | 1054 | 996 | 1019 |
| 80 | | 1150 | 1089 | 1112 |
| 90 | | 1268 | 1205 | 1235 |
| 95 | | 1334 | 1287 | 1326 |
| EP, ° F. | | — | — | |
| Total Sulfur, wt. % | 3.19 (ASTM D4294) | 3.06 | 0.43 | 1.16 (ASTM D4294) |
| Total Nitrogen, wt. % | 0.3 | <0.75 | | <0.8 |
| Hydrogen, wt. % | 11.8 | 13.2 | — | 11.7 |
| Carbon, wt. % | 86 | 87 | — | 86.3 |
| CCR, wt. % | 2.14 | 2.83 | 2.4 (ASTM D4530) | 2.55 (ASTM D4530) |
| C5 Insolubles, wt. % | 0.05 | 0.04 | | |
| C7 Insolubles, wt. % | — | — | | |
| Metal | | | | |
| Nickel, ppm | | | 3.4 | |
| Vanadium, ppm | | | 4.9 | |
| Total Acid No., mg KOH/gm | 2.14 | | 4.84 | 4.48 |
| Bromine No., ASTM D1159 | | | | 5 |
| Water (distillation) | | | −0.1 (Distillation) | <0.02 |
| Sediment | | | <0.01 (Extraction) | 0.07 (ASTM D473) |
| Pour Point (ASTM D97) | −24 C. | | 6 C. | 6 C. |
| SARA Analysis | | | | |
| Saturates, wt. % | 24 | | 28.3 | |
| Aromatics, wt. % | 39 | | 38.1 | |
| Resins, wt. % | 34.4 | | 32.9 | |
| Asphaltenes, wt. % | 0.4 | | 0.1 | |
| Ash, wt. % | <0.001 | | | 0.095 |

*The presence of low boiling material in Canadian Crude B is likely due to residual propane solvent.

The above characteristics significantly contrast with a typical Athabasca bitumen crude obtained according to the process described in Example 1. A typical Athabasca bitumen will typically have an API gravity of around 5-8, sulfur content of 4-5 wt %, nitrogen content of 3000-5000 wppm, hydrogen content of 10-11 wt %, and an asphaltene content of 14-20 wt %.

Example 4

A sample of one of the crude oils obtained in Example 3 was subjected to two gas chromatographs in series (GC*GC), in order to compare two different "dimensionalities" of the crude. The crude oil subjected to the GC*GC is differentiated through the first column, and then packets of the separated material are then further separated via a different column, which usually is a different separation method. This is then represented on chromatograms as 3D peaks or in the 2D version, such as the representative contour shown in FIG. 3. The actual contour was a colour contour, in which red, yellow and green areas represented presence of sulfur-containing compounds and blue areas represented absence of compounds. In the representative FIG. 3, the shading represents presence of sulfur-containing compounds. Darker or more densely shaded regions (32, 34) in the contour indicate higher concentration areas, while the least shaded area (34) represents absence of a material. The detector used was a Sulfur Chemiluminescence Detector (SCD) such as the Agilent 355 SCD, which shows only sulfur compounds.

Figure 3:
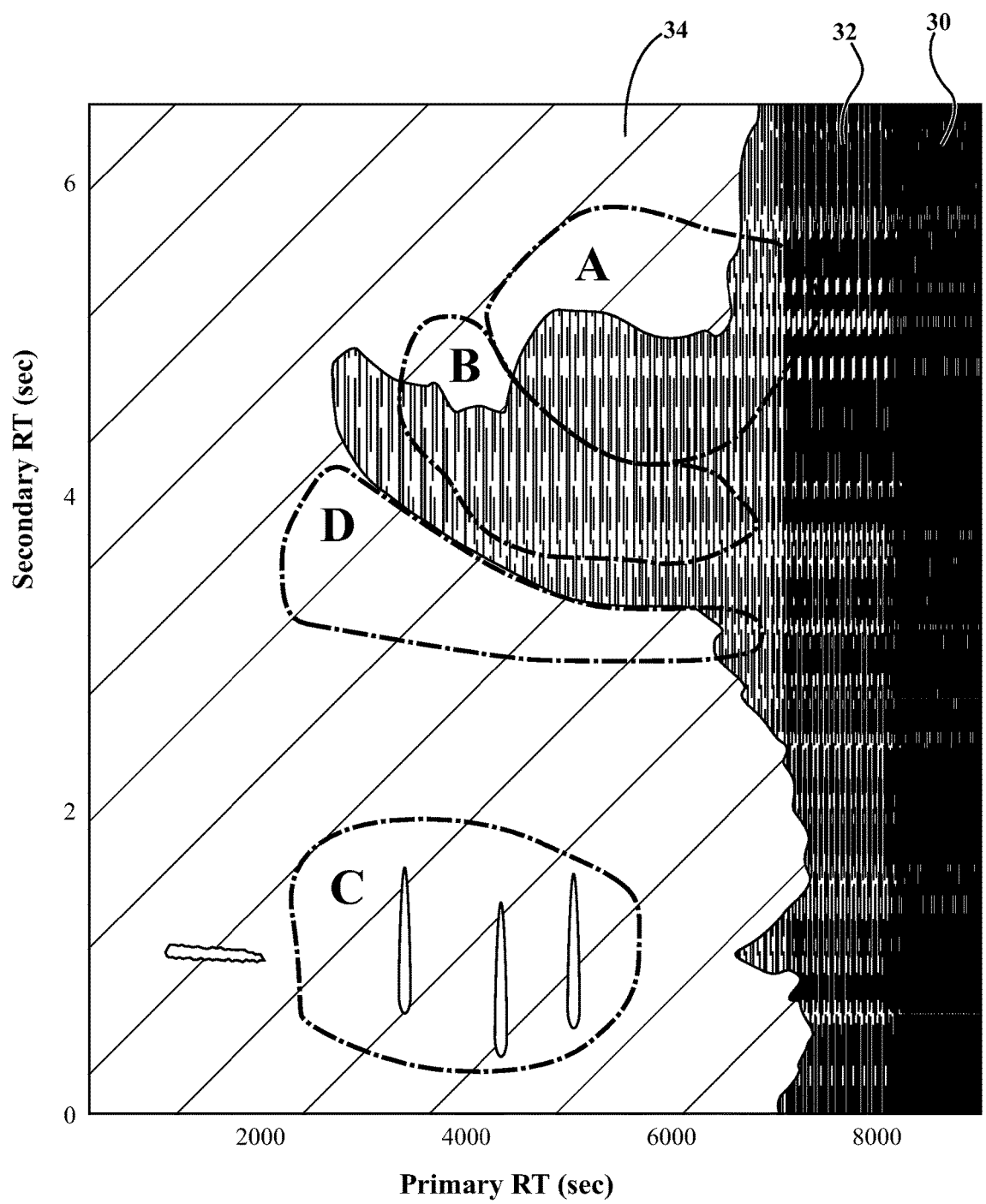
FIG. 3 is a representation of a SCD contour plot of a sample of the oil sands-derived crude oil of this invention, which has been subjected to GC*GC analysis.

The X axis of FIG. 3 represents the equivalent of boiling points of the sulfur compounds. The Y axis of FIG. 3 provides an indication of the relative level of aromaticity of the sulfur compounds. Therefore, the shaded areas located toward the left side of the plot indicate sulfur-containing compounds having relatively low boiling points, and on the right side of the plot, sulfur-containing compounds having higher boiling points. The materials at the bottom of the contour have low aromaticities, while the peaks to the top have higher aromaticities. The contour shown in FIG. 3 was obtained at an effective temperature of around 450 degrees F.

Although SCD includes background noise, the representative FIG. 3 shows an increase on the far right hand side of the contour, area 30. This increase, however, is not sulfur, but is due to a heat effect, which can be ignored. Nevertheless, it is likely the majority of the sulfur-containing compounds are located in area 32.

Areas A-C of the contour of FIG. 3 provide an indication that the inventive crude has characteristics similar to that of a heavy crude having been previously hydrotreated. For example, area A, highlighted on the chromatogram, is an indication of the presence of dibenzothiophenes. The area A is similar in appearance to a diesel fuel, since it indicates that the only sulfur compounds left are those are typically associated with a typical diesel fuel.

Area B of FIG. 3 is the area is similar to hydroteated oil materials that have been partially hydrogenated. Partial hydrogenation of hydrotreated materials occurs when aromatic rings have been hydrogenated, but the hydrotreatment did not manage to have the second step of the sulfur atom being removed. These molecules generally only occur after hydrotreating, as they are not naturally occurring in diesels.

Area C provides an indication of elemental sulfur in the forms of S8, S7 and S6. The presences of elemental sulfur can be the result of oxygen and $H_2S$, but the presence of the material is an indication of a heavy oil having the characteristics of a hydrotreated oil.

The areas that are clear of sulfur (e.g., area D of FIG. 3) are (from the bottom up) representative of straight chain thiols and single aromatic ringed thiophenes. These are easy to remove, when present, and FIG. 3 gives the appearance that the compounds have been completely removed from the oil sample.

Based on the observations from the contour of FIG. 3, the crude oil obtained from the process of this invention has characteristics similar to that of at least a mildly hydrotreated crude oil.

Example 5

Two samples were prepared from a batch of Athabasca oil sands ore, and the samples were analyzed by both proton (hydrogen) and carbon nuclear magnetic resonance (NMR) spectroscopy. One sample was a liquid extract of the Athabasca oil sands ore carried out according to Example 2. The second sample was a bitumen type extract carried out in the prior art process as described in Example 1. Each sample was dissolved in deuterated chloroform ($CDCl_3$) and subjected to NMR spectroscopic analysis at Intertek's laboratory in Allentown, Pa. The results are summarized below in the following Table 14.

TABLE 14

|  | Inventive Bitumen-Derived Oil | Bitumen Crude |
| --- | --- | --- |
| $^1H$ (Hydrogen or Proton) NMR |  |  |
| % Aromatic Hydrogen | 6 | 31 |
| % as hydrogen on a single ring | ~70 | ~50 |
| % as hydrogen on multi-ring aromatics | ~30 | ~50 |
| % Aliphatic Hydrogen | 94 | 69 |
| % as terminal methyl | 25 | 36 |
| % as internal hydrogen | 57 | 50 |
| % as carbon adjacent to aromatic hydrogen | 18 | 14 |
| $^{13}C$ (Carbon) NMR |  |  |
| % Aromatic Carbon | 25 | 34 |
| % as protonated aromatic | ~50 | ~50 |
| % as quaternary aromatic | ~50 | ~50 |
| % Aliphatic Carbon | 75 | 66 |
| % as paraffinic carbon | 39 | 34 |
| % as naphthenic (ring) carbon | 61 | 66 |

The data show that there is a substantial difference in hydrogen distribution between the inventive oil and the standard bitumen sample. Based on elemental analyses, the inventive oil sample has a substantially higher hydrogen content than does the standard bitumen sample.

The $^1H$ NMR data also show that most (~70%) of the aromatic hydrogens that are found in the inventive bitumen-derived oil sample are bound to single ring aromatics, whereas only about half of the aromatic hydrogens in the standard bitumen sample are bound to single ring aromatics with the other half on multi ring aromatic structures.

The $^{13}C$ NMR data show a higher concentration of aromatic carbons for the standard bitumen sample than for the inventive oil sample.

The $^1H$ NMR data and the $^{13}C$ NMR data demonstrate that the inventive oil sample is a substantially higher quality bitumen-derived crude oil in that it is more paraffinic, less aromatic and has fewer potential coke forming multi-ring aromatic precursors.

Example 6

From the data in Table 13, Example 3, the following characteristics of the Crude from Canadian Ore A were converted to mole percents: carbon, hydrogen, nitrogen and sulfur. The total percent of carbon, hydrogen, nitrogen and sulfur was subtracted from 100 to determine mole percent of oxygen. Based on the determined mole percents, the types of sulfur compounds indicated by the SCD (as described in Example 4) and the aromatic hydrogen and carbon NMR data from Example 5, a representative generic $C_{60}$ structure for the average of the Crude from Canadian Ore A was determined to be $C_{60}H_{99}NO$ (mol. wt. 850). A specific species of the representative generic $C_{60}$ structure can be exemplified by the following:

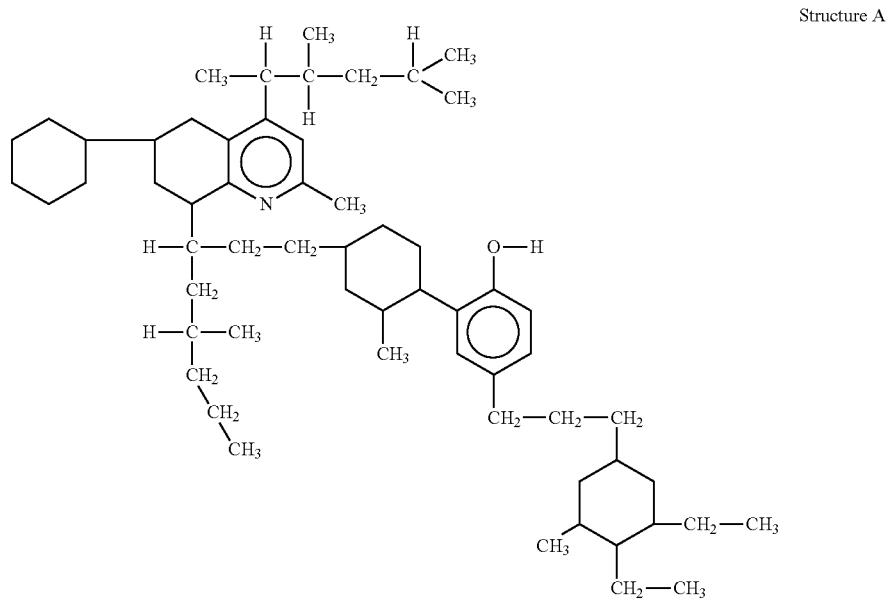

Structure A

Based on the data of the bitumen samples described in: www.ags.gov.ab.ca/publications/OFR/PDF/OFR_1993_25.PDF—Appendix B, a representative generic $C_{60}$ structure for the average of the bitumen-derived crudes shown was determined to be $C_{60}H_{87}NS$ (mol. wt. 854). A specific species of the representative generic $C_{60}$ structure can be exemplified by the following:

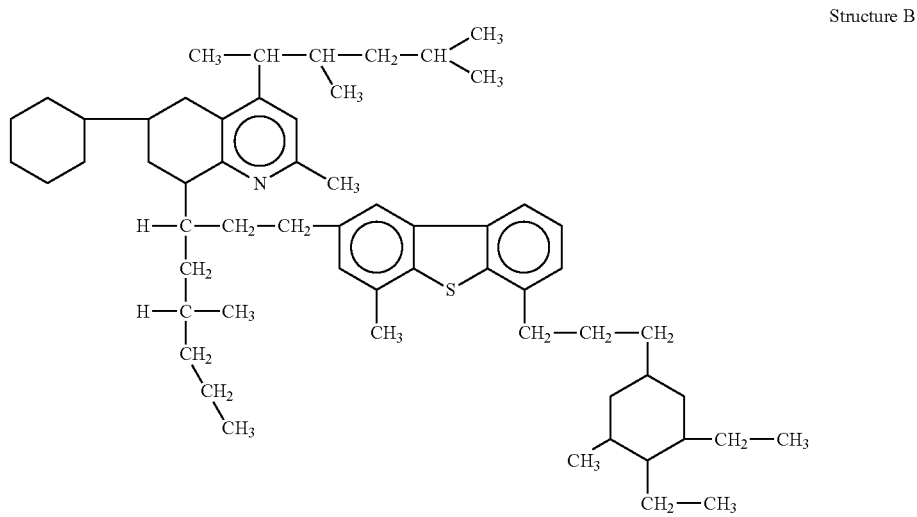

Structure B

Example 7

A bitumen-derived crude oil obtained according to the process of this invention and conventional bitumen-derived crude oil are independently catalytically cracked in a catalytic cracking unit according to the following conditions:
Run Conditions
i) Catalyst: zeolite molecular sieve type catalyst
ii) Temperature: 1200-1300 F
iii) Pressure: 30-35 psig
The results can be shown as in the following Table 15.

TABLE 15

| Feed | Cracked Products of Inventive Bitumen-Derived Oil | Cracked Bitumen Oil Products | Cracked SCO Products | ExxonMobil FCC, Resid Feed* |
|---|---|---|---|---|
| Naphtha, wt. % | 50-60 | 30-40 | 38-48 | 43 |
| Light Cycle Oil, wt. % | 20-26 | 22-28 | 23-27 | 24 |
| Heavy Cycle Oil, wt. % | 12-18 | 22-28 | 16-20 | 13 |
| Residue, wt. % | 1-3 | 6-10 | 5-9 | 7 |
| Gas, wt. % by difference | 2-8 | 5-9 | 5-9 | 13 |

*"Exxon Flexicracking IIIR Fluid Cat Cracking, Table 3.1.3 in Handbook of Petroleum Refining Processes, second edition, Robert A. Myers, Editor in Chief, McGraw Hill, 1997

Table 1 5 provides an indication that the catalytically cracked product of the inventive bitumen-derived crude oil is substantially higher in naphtha content compared to the conventional bitumen-derived crude oils. Such an indication demonstrates the substantially higher quality of the bitumen-derived crude oil, particularly with regard to providing high quality transportation fuels.

The catalytically cracked product of the inventive bitumen-derived crude oil would also be substantially lower in residue content and gas by-product compared to the conventional bitumen-derived crude oils. This would demonstrate that the higher quality bitumen-derived crude oil of the invention provides for increased volumetric production of liquid transportation fuels compared to the conventional bitumen-derived crude oils.

Example 8

As shown in Table 13 of Example 3, the sulfur content of Canadian Ore A (a bitumen-derived crude of the invention) was determined by ASTM D4294 to be 3.19 wt %. Sulfur content of a standard bitumen crude (based on the average of the nine Athabasca bitumen samples described in the: www.ags.gov.ab.ca/publications/OFR/PDF/OFR_1993_25.PDF-Appendix B) is estimated to be 4.58 wt %.

Based on the structures determined for Canadian Ore A (Structure A of Example 6) and the standard bitumen crude (Structure B of Example 6), the sulfur compounds of the standard bitumen crude are substantially higher in multi-ring aromatic content than the bitumen-derived crude of the invention.

Based on the SCD contour map of FIG. 3, described in Example 4, and the structures of Example 6, crudes representative of the invention, on a basis of percentage of total sulfur in the sample (e.g., the Crude from Canadian Ore A), are substantially richer in components such as mercaptans, sulfides, disulfides, thiophenes, benzothiophenes and hydrogenated benzothiophenes (i.e., hydroaromatic compounds) and reduced in dibenzothiophenes and dialkyldibenzothiophenes compared to standard bitumen-derived crude.

Based on the comparative structures of the Canadian Ore A and the standard Athabasca bitumen samples, it is expected that the bitumen-derived crude oils of this invention can be readily converted to transportation fuels compared to the standard bitumen crudes. For example, the crudes of this invention can be highly suited as catalytic cracking feedstock, with optional mild hydrotreating for partial hydrogenation of aromatic rings, while the high concentration of multi-ring aromatic sulfur compounds in the standard bitumen crudes would be detrimental to the catalyst in a catalytic cracking conversion process.

The principles and modes of operation of this invention have been described above with reference to various exemplary and preferred embodiments. As understood by those of skill in the art, this invention also encompasses a variety of preferred embodiments within the overall description of the invention as defined by the claims, which embodiments have not necessarily been specifically enumerated herein.

We claim:

1. A process for producing a naphtha stream from a deasphalted crude oil stream extracted from oil sand, comprising:
   a) obtaining the desphalted crude oil stream at a refinery having a secondary upgrading plant, wherein the deasphalted crude stream is obtained from a water-free selective extraction process that includes the steps of:
      (i) supplying a hydrocarbon solvent comprised of at least 90 wt % of a recycle solvent stream to a contact zone of a vessel, wherein: 1) the hydrocarbon solvent has a Hansen dispersion blend parameter of not greater than 16, a Hansen polarity blend parameter of less than 1 and a Hansen hydrogen bonding blend parameter of less than 2, and 2) the recycle solvent stream is comprised of at least 90 wt % of one or more of propane and butane,
      (ii) supplying a feed stream of the oil sand to the contact zone of the vessel, wherein the oil sand feed stream is comprised of at least 4 wt % total bitumen, based on total weight of the supplied oil sand feed stream,
      (iii) contacting the oil sand feed stream with the hydrocarbon solvent in the contact zone of the vessel, while the oil sand feed stream is moved through the contact zone of the vessel, to selectively extract an oil fraction from the total bitumen on the contacted oil sand, wherein the oil fraction is comprised of not greater than 80 wt % of the total bitumen present on the oil sand, and asphaltenic hydrocarbon remains with the contacted oil sand,
      (iv) separating, following the contacting step a (iii), the hydrocarbon solvent, the solvent-contacted oil sand, and the selectively extracted oil fraction to produce the recycle solvent stream, solid tailings, and the deasphalted crude oil stream, wherein the deasphalted crude oil stream has an ASTM D7169 5% distillation point of from 400° F. to 700° F., an asphaltenes content of not greater than 10 wt %, a Conradson Carbon Residue (CCR) of not greater than 15 wt %, a nickel plus vanadium content of not greater than 150 wppm, a total acid number (TAN) of from 1-8 mg KOH/gm, and a sulfur content of not greater than 4 wt %, and (v) placing into the ground the solid tailings separated in step a (iv), without producing tailings ponds;

b) hydrotreating the deasphalted crude oil stream obtained in step 1a) to reduce the TAN of the deasphalted crude oil stream by hydrotreating the deasphalted crude oil stream in the presence of a hydrotreating catalyst containing at least one Group VIB metal and at least one non-noble Group VIII metal at a H$_2$/HC ratio of from 10-50 std m$^3$/m$^3$; and c) catalytically cracking at least a portion of the hydrotreated, deasphalted crude oil stream in the presence of a catalytic cracking catalyst to produce catalytically cracked product streams, wherein the catalytically cracked product streams comprise the naphtha stream, and the naphtha stream is ≥45 wt % of the total amount of cracked product streams produced.

2. The process of claim 1, wherein the recycle solvent stream is comprised of at least 90 wt % of propane.

3. The process of claim 1, wherein the treatment with the hydrotreating catalyst is carried out at a temperature of 260° C. to 380° C.

4. The process of claim 3, wherein the treatment with the hydrotreating catalyst is carried out in a reactor at a pressure of 30-160 bar and a hydrogen partial pressure 5-100 bar.

5. The process of claim 1, wherein the catalytic cracking catalyst is comprised of a crystalline tetrahedral framework oxide component.

6. The process of claim 5, wherein the catalytically cracked product streams comprise a heavy cycle oil stream that is ≤25 wt % of the total amount of cracked products produced.

7. The process of claim 6, wherein catalytically cracked product streams comprise the naphtha stream and the heavy cycle oil stream at a weight ratio of the naphtha stream to the heavy cycle oil stream of ≥2:1.

8. The process of claim 1, wherein the deasphalted crude oil stream has an aromatic hydrogen content of ≤30%.

9. The process of claim 8, wherein the deasphalted crude oil stream has an aromatic carbon content of ≤30%.

10. The process of claim 9, wherein the deasphalted crude oil stream has an aromatic carbon to aromatic hydrogen ratio of ≥1.5:1.

11. The process of claim 1, wherein the vessel is a horizontal contactor and the oil sand feed stream is moved through to the contact zone of the horizontal contactor by pumping the oil sand through the horizontal contactor.

12. The process of claim 11, wherein pumping is by auger movement.

13. The process of claim 1, wherein the hydrocarbon solvent is injected into the contact zone of the vessel, while the oil sand feed stream is moved through the contact zone of the vessel.

* * * * *